United States Patent
Berger et al.

(10) Patent No.: US 10,528,912 B2
(45) Date of Patent: Jan. 7, 2020

(54) USER PROFILE IMPROVEMENT SYSTEM

(71) Applicant: Microsoft Technology Licensing, LLC, Redmond, WA (US)

(72) Inventors: Erran Berger, San Francisco, CA (US); Elliot Shmukler, Palo Alto, CA (US); Aaron Bronzan, San Francisco, CA (US); Yu-En Tsai, Fremont, CA (US); Avery Randolph Moon, Redwood Shores, CA (US); Amy Parnell, Belmont, CA (US); Jonathan Redfern, Truckee, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 435 days.

(21) Appl. No.: 13/673,196

(22) Filed: Nov. 9, 2012

(65) Prior Publication Data
US 2014/0136933 A1    May 15, 2014

(51) Int. Cl.
*G06Q 10/10* (2012.01)
*G06Q 50/00* (2012.01)

(52) U.S. Cl.
CPC ............. *G06Q 10/10* (2013.01); *G06Q 50/01* (2013.01)

(58) Field of Classification Search
CPC ...................... G06F 1/3218; G09G 2320/0606
See application file for complete search history.

(56) References Cited

U.S. PATENT DOCUMENTS

| | | | |
|---|---|---|---|
| 2007/0162507 A1* | 7/2007 | McGovern | G06Q 10/06 |
| 2007/0250370 A1* | 10/2007 | Partridge | G06Q 10/063112 |
| | | | 705/7.14 |
| 2007/0276795 A1* | 11/2007 | Poulsen | G06Q 90/00 |
| 2008/0133677 A1* | 6/2008 | Pattabhiraman | G06Q 10/00 |
| | | | 709/206 |
| 2009/0157732 A1* | 6/2009 | Hao | H04M 3/53325 |
| 2009/0309698 A1* | 12/2009 | Headley | G06F 21/316 |
| | | | 340/5.52 |
| 2009/0327013 A1* | 12/2009 | McGovern | G06Q 10/10 |
| | | | 705/321 |
| 2009/0327054 A1* | 12/2009 | Yao | G06Q 30/02 |
| | | | 705/12 |
| 2010/0324970 A1* | 12/2010 | Phelon | G06F 17/30867 |
| | | | 705/321 |
| 2011/0029620 A1* | 2/2011 | Bonforte | H04L 67/306 |
| | | | 709/206 |
| 2011/0086699 A1* | 4/2011 | Allen | G07F 17/32 |
| | | | 463/25 |
| 2012/0078803 A1* | 3/2012 | MacArthur | G06Q 10/063112 |
| | | | 705/319 |

* cited by examiner

Primary Examiner — Scott T Baderman
Assistant Examiner — Steve P Golden
(74) Attorney, Agent, or Firm — Schwegman Lundberg & Woessner, P.A.

(57) ABSTRACT

According to various example embodiments, a prompt is superimposed over a second user profile page that is being viewed by a first user, the prompt inviting the first user to update their own user profile page, based on the second user profile page being viewed. For example, the prompt may invite the first user to add a piece of content on their profile page that is included in the second user profile page but is missing from the first user profile page.

19 Claims, 25 Drawing Sheets

400

401

402

John Smith
Accountant at ABC
San Francisco Bay Area

411 — Experience     + Add a position

412 — Accountant
ABC
December 2008-Present

413 — Accountant
LMNO
December 2003-December 2008

421 — Education     + Add a position

422 — University of Illinois
B.S. Accounting
1999-2003

1801 — Dave Davidson
Engineer at Acme
San Francisco Bay Area

1802 — [person icon]

1811 — Experience  + Add a position

1812 — Engineer
Acme
December 2010-Present

1813 — Intern
XYZ
Summer 2009

1821 — Education  + Add a position

1822 — University of Michigan
B.S.E. Computer Engineering
2006-2010
    -University Honors
    -Dean's Scholar
    -Senior Thesis on Memory Chips

*Fig. 18*

USER PROFILE IMPROVEMENT SYSTEM

TECHNICAL FIELD

The present application relates generally to user profiles and, in one specific example, to a user profile improvement system.

BACKGROUND

Online social and professional networking websites are becoming increasingly popular, with many such websites boasting millions of active users. Each user of the networking website is able to upload an editable user profile page to the networking website. The user profile page may include various information about the user, such as the user's biographical information, photographs of the user, and information describing the user's employment history, education history, skills, experience, activities, and the like. Such user profile pages of the networking website are viewable by, for example, other users of the networking website.

BRIEF DESCRIPTION OF THE DRAWINGS

Some embodiments are illustrated by way of example and not limitation in the figures of the accompanying drawings in which:

FIG. 4 illustrates an example portion of a user profile page, according to various embodiments.

FIG. 18 illustrates an example portion of a user profile page, according to various embodiments.

DETAILED DESCRIPTION

Example methods and systems for improving user profile pages are described. In the following description, for purposes of explanation, numerous specific details are set forth in order to provide a thorough understanding of example embodiments. It will be evident, however, to one skilled in the art that the present invention may be practiced without these specific details.

Figure 1:
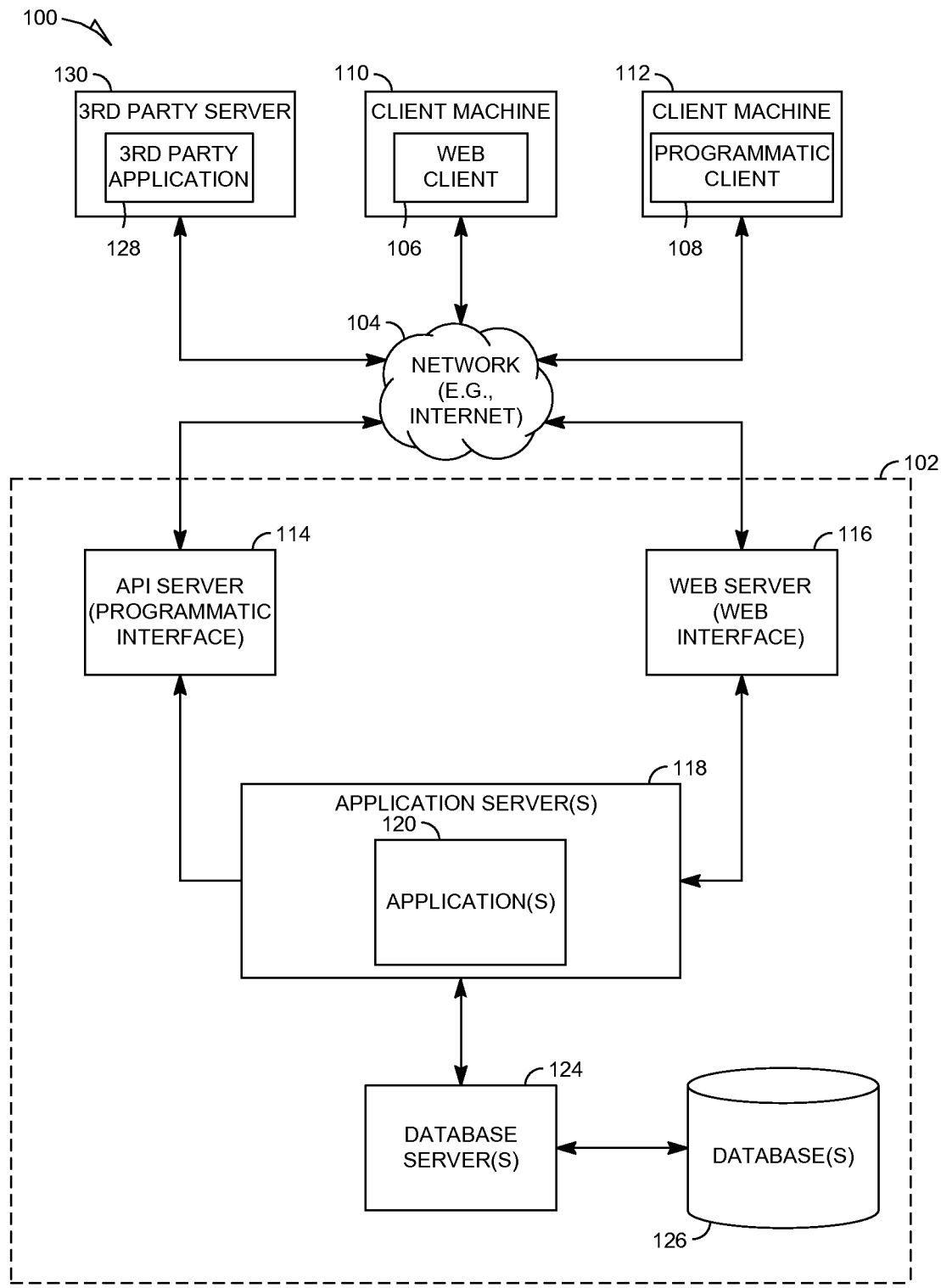
FIG. 1 is a network diagram depicting a client-server system, within which one example embodiment may be deployed.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may correspond to one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
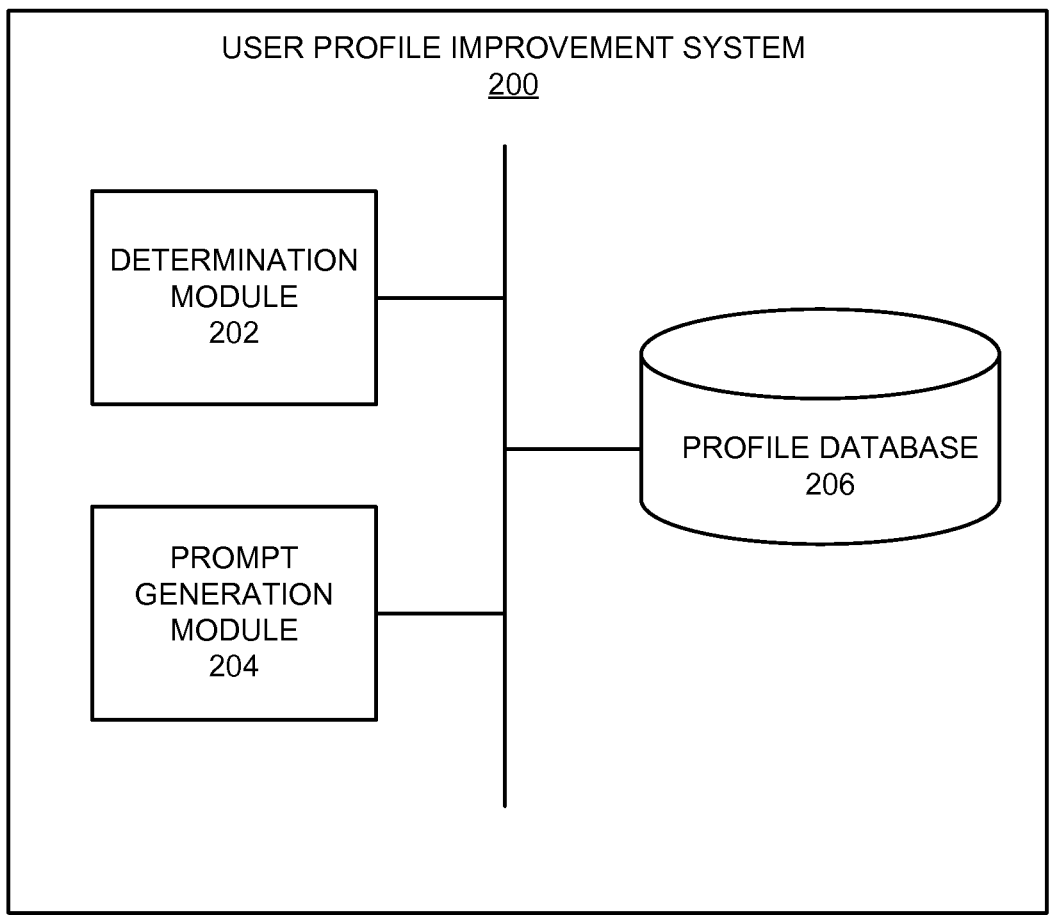
FIG. 2 is a block diagram of an example system, according to various embodiments.

Turning now to FIG. 2, a user profile improvement system 200 includes a determination module 202, a prompt generation module 204, and a profile database 206. The modules of the user profile improvement system 200 may be implemented on a single device such as a user profile improvement device, or on separate devices interconnected via a network. The aforementioned user profile improvement device may correspond to, for example, one of the client machines 110, 112 or application server(s) 118 illustrated in FIG. 1.

The determination module 202 is configured to determine that a first user associated with a first user profile page is currently viewing a second user profile page associated with a second user. For example, online social and professional networking websites may have multiple users (or "members"), where each user of the networking website is able to upload an editable user profile page to the networking website. The user profile page may include various information about the user, such as the user's biographical information, photographs of the user, and information describing the user's employment history, education history, skills, experience, activities, interests, work product, and the like. Such user profile pages of the networking website are then viewable by, for example, other users of the networking website. Thus, the first and second users described above may be users of a social or professional networking website, and the first user may be associated with their own profile page (i.e., the first user profile page) of the networking website that includes information regarding the first user, while the second user may be associated with their own profile page (i.e., the second user profile page) of the networking website that includes information regarding the second user.

Figure 3:
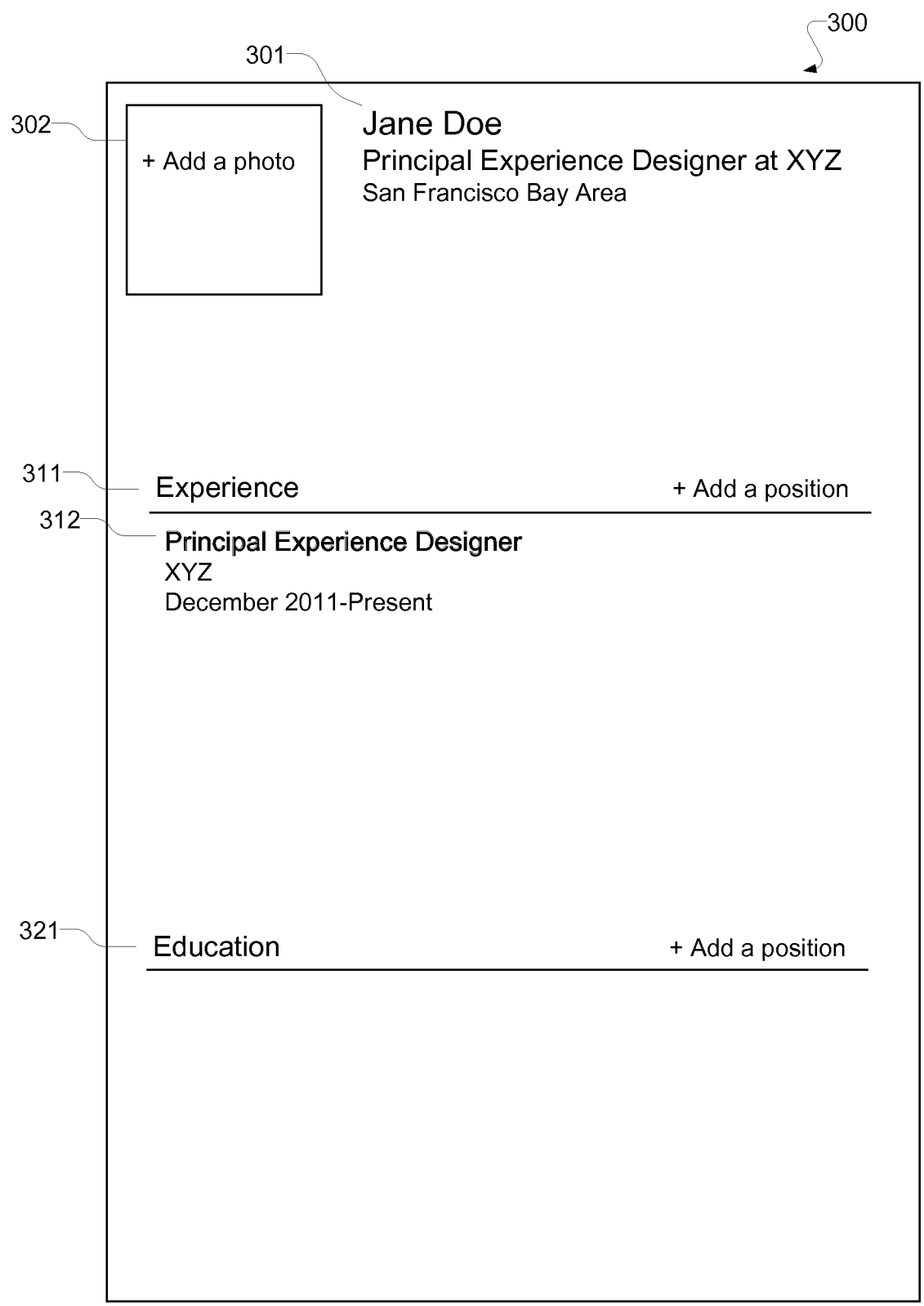
FIG. 3 illustrates an example portion of a user profile page, according to various embodiments.

An example of a first user profile page 300 of a first user (e.g., a LinkedIn® page of a user "Jane Doe") is illustrated in FIG. 3. As seen in FIG. 3, the user profile page 300 includes identification information 301, such as the user's name ("Jane Doe"), user's current employment position, ("Principal Experience Designer at XYZ"), and geographic address/location information ("San Francisco Bay Area"). The user's profile page also includes a photo area 302 for displaying a photograph of the user. Furthermore, as illustrated in FIG. 3, the user profile page 300 also includes various sections (also known as fields). In particular, the user profile page 300 includes an experience section 311 including listings of experience positions of the user (e.g., employment/volunteer experience position 312), and an education section 321 including listings of educational credentials of the user (e.g., university degrees or diplomas earned or currently being earned by the user). FIG. 4 illustrates an example of second user profile page 400 of second user (e.g., a LinkedIn® page of a user "John Smith"), including identification information 401, photo area 402 with a photo of the user, an experience section 411 including listings of experience positions 412 and 413 of the user, and an education section 421 including listings of educational credentials 422 of the user.

The user profile pages 300 and 400 are merely exemplary. For example, while the user profile pages 300 and 400 include experience and educations sections/fields, it is apparent that these sections/fields may be supplemented or replaced by other sections/fields (e.g., a general portfolio section/field, an art portfolio section/field, a music portfolio section/field, a photography portfolio section/field, a multimedia section/field, and so forth). The user profile pages may include other information, such as various identification information (name, username, email address, geographic address, networks, location, phone number, etc.), education information, employment information, resume information, skills, experience, activities, group membership, images, photos, preferences, news, status, links or URLs on the profile page, and so forth, as understood by those skilled in the art.

The user profile pages of the networking website may correspond to user profile web pages hosted by a remote web server associated with the networking website (e.g., server 118 illustrated in FIG. 1). Such user profile web pages may be accessible through a network (e.g., the Internet) with use of a web browser of a client device that accesses a specific Uniform Resource Locator (URL) reference link corresponding to each user profile web page. For example, when a user of a client device (e.g., client machines 110 or 112 illustrated in FIG. 1) provides the appropriate user commands to a browser application operating on the client device, the browser application transmits a request to the appropriate URL through a network (e.g., the Internet), and the remote web server transmits a response to the browser application of the client device, where the response includes code corresponding to the user profile page (e.g., HTML code, HTML5 code, XHTML code, JavaScript code, etc.). Thereafter, the browser application interprets the received code, and renders the code as a visual webpage that may be displayed by a display unit of the client device (e.g., a display screen or display monitor), so that the user profile web page may be viewed by the user of the client device. Such aspects of a browser application accessing web pages hosted by remote web servers through a network are understood by those skilled in the art, and hence shall not be described in further detail in the interests of brevity.

Returning back to FIG. 2, the determination module 202 may determine that a first user is viewing the second user profile page of a second user, when a particular client device (e.g., client machines 110 or 112 illustrated in FIG. 1) corresponding to the first user accesses the URL corresponding to the second user profile page. The determination module 202 may determine that the particular client device corresponds to the first user by, for example, determining that the browser application of that particular device has transmitted user login information (or user authentication information or user identification information) associated with the first user to the remote web server. For example, when the first user enters their user name and password into a particular client device, such information is provided to the networking website hosted by the remote web server in order to login to the networking website.

After the determination module 202 determines that a client device corresponding to a first user associated with a first user profile page is currently displaying a second user profile page associated with a second user, the determination module 202 is configured to determine that a specific content portion of the second user profile page is missing from the first user profile page. For example, after the determination module 202 determines that a client device corresponding to a first user "Jane Doe" associated with a first user profile page 300 (see FIG. 3) is currently displaying a second user profile page 400 associated with a second user "John Smith" (see FIG. 4), the determination module 202 is configured to identify a specific content portion of the second user profile page 400 that is missing from the first user profile page 300. As described herein, the aforementioned "specific content portion" refers to any portion of the content associated with a user profile page.

For example, as described above, the user profile page 400 illustrated in FIG. 4 includes identification information 401 and a photo area 402 for displaying a photograph of the user. Furthermore, the user profile page 400 also includes various sections (also known as fields), such as an experience section 411 including listings of experience positions 412 and 413 of the user, and an education section 421 including listings of educational listing 422 of the user. Thus, the determination module 202 may compare the second user profile page 400 and the first user profile page 300, in order to determine if there is any specific content portion in the second user profile page (e.g., a photo, a particular section/field, a listing, etc.) that is not included in the first user profile page. The determination module 202 may make the aforementioned determinations based on the content of the user profile pages by, for example, analyzing database records in profile database 206 that contain user profile data associated with each user or each user profile page.

For example, with reference to FIGS. 3 and 4, the determination module 202 may determine that while the second user profile page 400 includes a photo in photo area 402, the first user profile page 300 does not include a photo in photo area 302. Similarly, the determination module 202 may determine that while second user profile page 400 includes an education section 421 (or a completed education section 421 including an education listing 422), the first user profile page 300 does not include an education section (or does not include a completed education section 321 that includes an education listing). As another example, the determination module 202 may determine that while the second user profile page 400 includes a certain number of experience listings (i.e., two experience listings, 412 and 413), the first user profile page 300 includes a lower number of experience listings (i.e., only a single experience listing 312). As described above, the user profile pages 300 and 400 are merely exemplary, and while the user profile pages 300 and 400 include experience sections and educations sections, these sections or fields may be supplemented or replaced by other sections or fields (e.g., an art portfolio section/field, a music portfolio section/field, a photography portfolio section/field, a multimedia section/field, and so forth). Thus, as another example, the determination module 202 may determine that, for example, a second user profile page includes a portfolio section/field, while the first user profile page does not include such a portfolio section/field.

After the determination module 202 determines that a specific content portion of the second user profile page is missing from the first user profile page, the prompt generation module 204 superimposes a prompt over the second user profile page being viewed by the first user (i.e., being accessed and displayed by the client device associated with the first user). In particular, the prompt invites or encourages the first user to update their first user profile page, based on the second user profile page. For example, the prompt may invite the first user to update their first user profile page when the prompt includes a reference to the aforementioned specific content portion (that was determined by the determination module 202 to be missing from the first user profile page). Instead, or in addition, the prompt may include a reference to the second user, and/or a reference to the second user profile page generally, and/or a reference to any part of the second user profile page.

Figure 5:
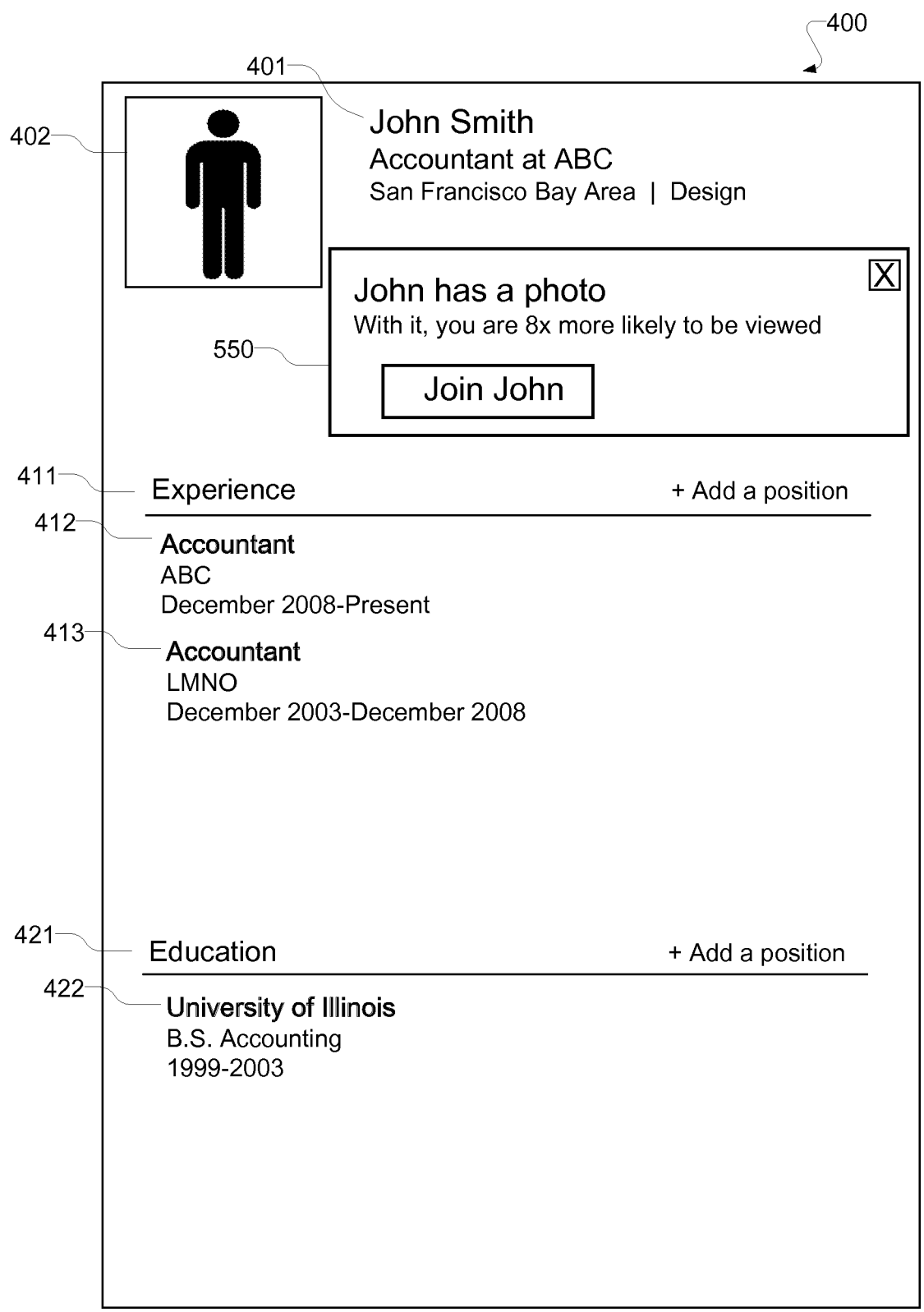
FIGS. 5-8 illustrate example portions of user profile pages with prompts superimposed thereon, according to various embodiments.

For example, the determination module 202 may have determined that while the second user profile page 400 includes a photo in photo area 402, the first user profile page 300 does not include a photo in photo area 302. Accordingly, FIG. 5 illustrates user profile page 400 that is substantially similar to the second user profile page 400 illustrated in FIG. 4. If the first user Jane Doe associated with the first user profile page 300 is currently viewing the second user profile page 400 associated with the second user John Smith, then as illustrated in FIG. 5, the prompt generation module may superimpose the prompt 550 over the second user profile page 400. The prompt 550 identifies the specific content portion of the second user profile page 500 (i.e., user photo 402) that was determined by the determination module 202 to be missing from the first user profile page 300. If the user Jane Doe decides to proceed with updating her user profile, the user may click on a button within the prompt (e.g., "John Join") that includes a reference link to a profile edit webpage/wizard, and the user will be presented with the profile edit webpage/wizard that will allow the user to edit their own profile page (and may include specific instructions or suggestions regarding how the user can update their own profile page).

Figure 6:
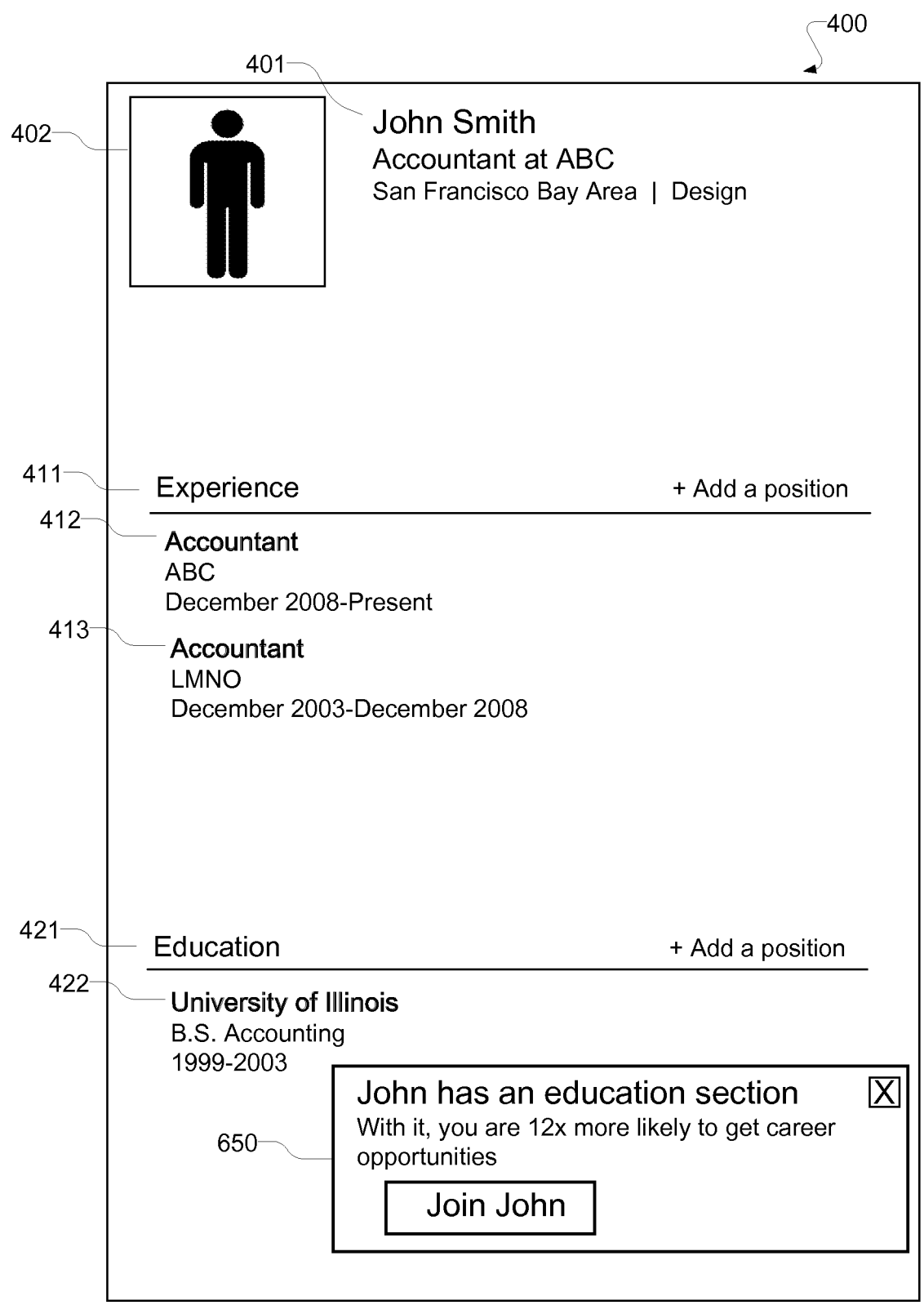

As another example, the determination module 202 may have determined that while second user profile page 400 includes an education section 421 (or a completed education section 421 including an education listing 422), the first user profile page 300 does not include an education section (or does not include a completed education section 321 that includes an education listing). Accordingly, FIG. 6 illustrates user profile page 400 that is substantially similar to the second user profile page 400 illustrated in FIG. 4. If the first user Jane Doe associated with the first user profile page 300 is currently viewing the second user profile page 400 associated with the second user John Smith, then as illustrated in FIG. 6, the prompt generation module may superimpose the prompt 650 over the second user profile page 400. The prompt 650 identifies a specific portion of the content of the second user profile page 400 (i.e., an education section 421 or education listing 422) that is determined by the determination module 202 to be missing from the first user profile page 300.

Figure 7:
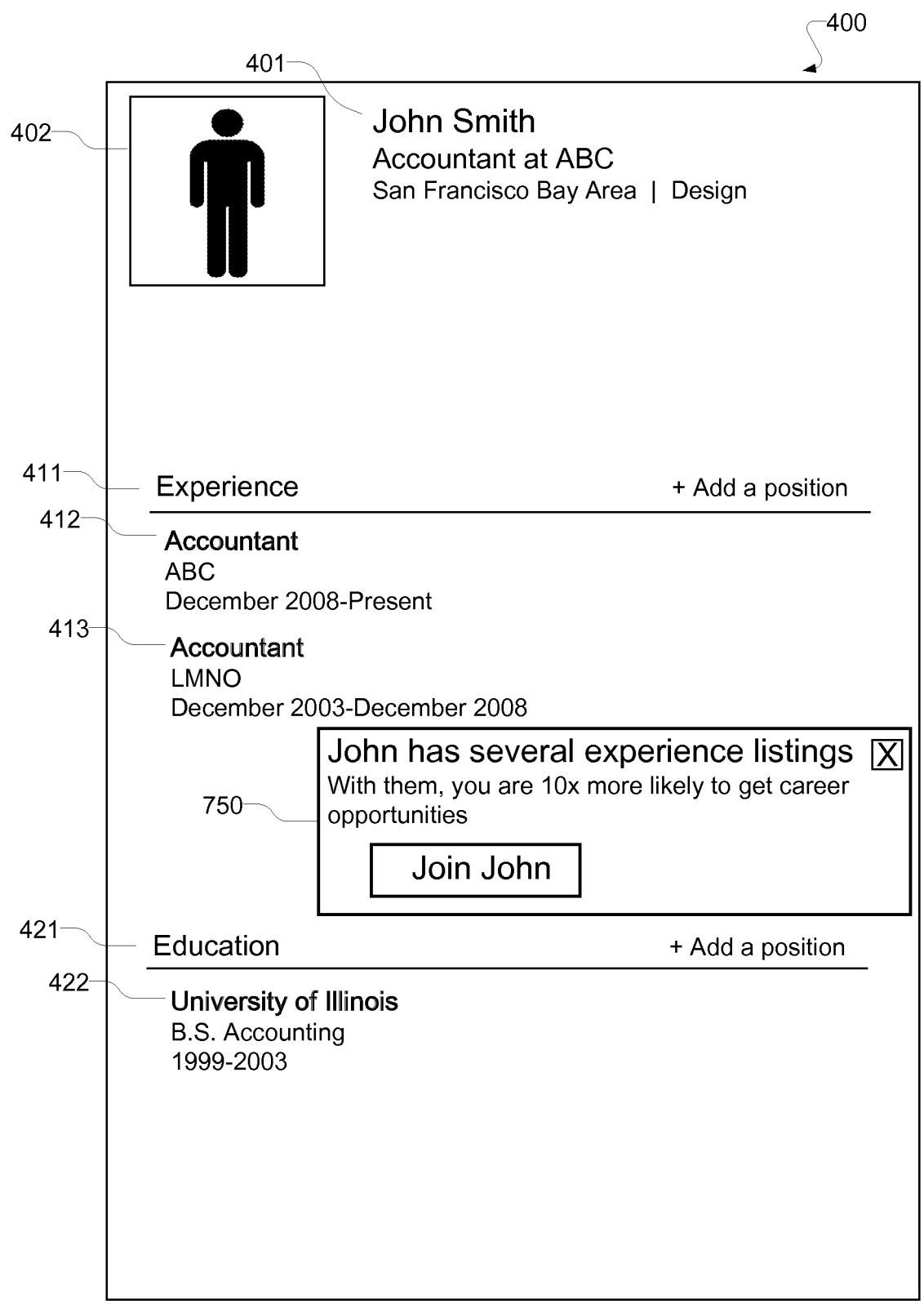

As another example, the determination module 202 may have determined that while the second user profile page 400 includes multiple experience listings 412 and 413, the first user profile page 300 only includes a single experience listing 312. Accordingly, FIG. 7 illustrates user profile page 400 that is substantially similar to the second user profile page 400 illustrated in FIG. 4. If the first user Jane Doe associated with the first user profile page 300 is currently viewing the second user profile page 400 associated with the second user John Smith, then as illustrated in FIG. 7, the prompt generation module may superimpose the prompt 750 over the second user profile page 400. The prompt 750 identifies a specific portion of the content of the second user profile page 400 (i.e., multiple experience listings 412, 413) that is determined by the determination module 202 to be missing from the first user profile page 300. Thus, according to various exemplary embodiments, the prompt generated by the prompt generation module 204 identifies a specific content portion of the second user profile page (e.g., a photo, an experience listing, an education listing, etc.) determined to be missing from the first user profile page.

Figure 8:
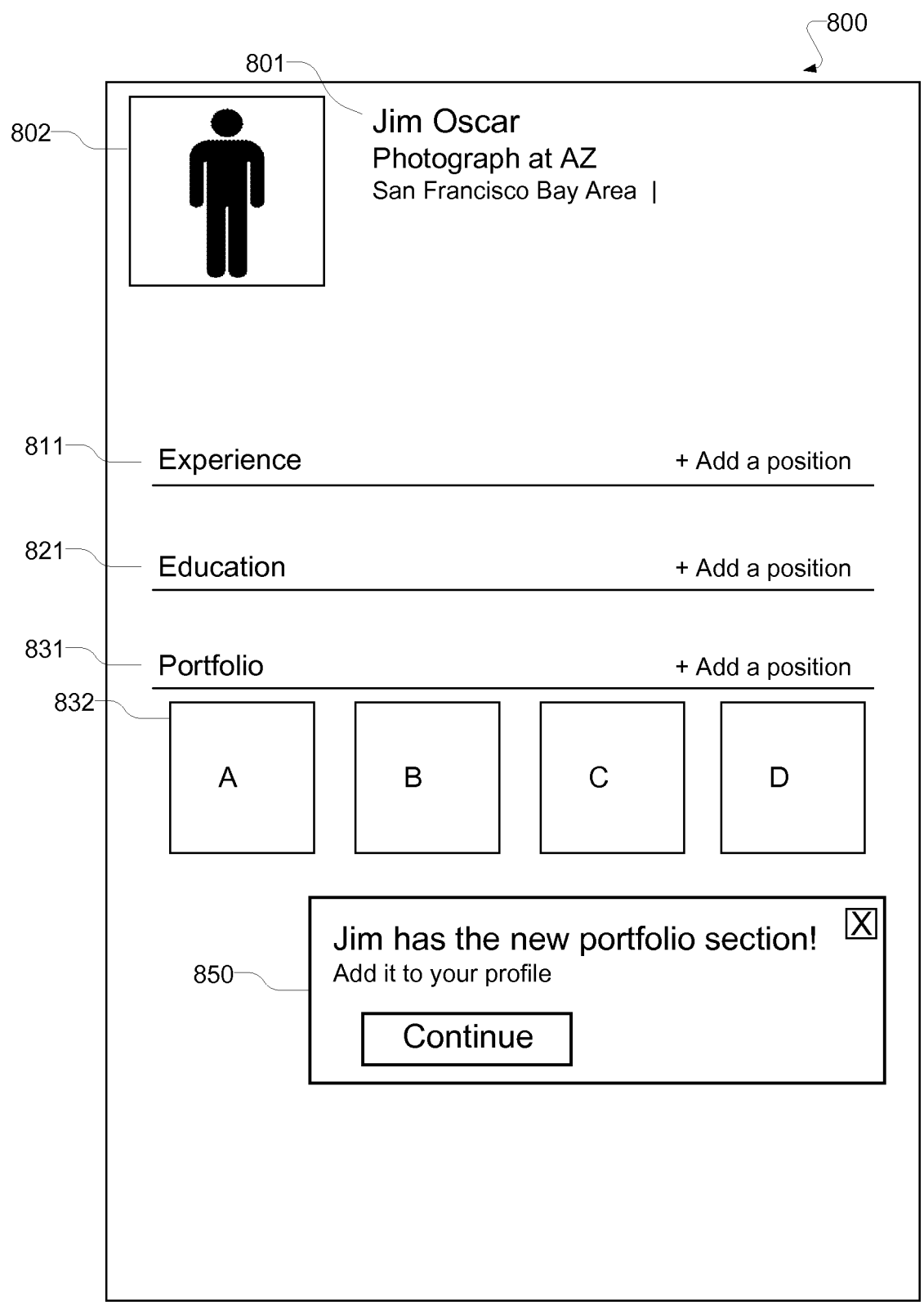

As illustrated in FIGS. 6-8, the prompt generation module 204 may display the prompt near the specific content portion of the second user profile page (that was determined by the determination module 202 to be missing from the first user profile page). For example, in FIG. 5 the prompt 550 generated by the prompt generation module 204 and displayed over the second user profile page 400 identifies the user photo 402 that is missing from the first user profile page 300, and the prompt 550 is displayed near the photo 402. As another example, in FIG. 6 the prompt 650 generated by the prompt generation module 204 and displayed over the second user profile page 400 identifies the education section 421 or education listing 422 that is missing from the first user profile page 300, and the prompt 650 is displayed near the education section 421 or education listing 422 of. As another example, in FIG. 7 the prompt 750 generated by the prompt generation module 204 and displayed over the second user profile page 400 identifies the multiple experience listings 412, 413 that are not included in the first user profile page 300, and the prompt 750 is displayed near the multiple experience listings 412, 413.

Moreover, as illustrated in FIGS. 6-8, the prompt generated by the prompt generation module 204 may identify an advantage associated with the specific content of the second user profile page (that is determined by the determination module 202 to be missing from the first user profile page). For example, in FIG. 5 the prompt 550 generated by the prompt generation module 204 and displayed over the second user profile page 400 identifies the user photo 402 that is missing from the first user profile page 300, and the prompt 550 identifies an advantage associated with including a user photo in the first user profile page 300 (such as increasing a view count of the first user profile page). As another example, in FIG. 6 the prompt 650 generated by the prompt generation module 204 and displayed over the second user profile page 400 identifies the education section 421 or education listing 422 that is missing from the first user profile page 300, and the prompt 650 identifies an advantage associated with including an education section or listing in the first user profile page 300 (such as increasing the possibility or receiving messages regarding career opportunities). As another example, in FIG. 7 the prompt 750 generated by the prompt generation module 204 and displayed over the second user profile page 400 identifies multiple experience listings 412, 413 that are not present in the first user profile page 300, and the prompt 750 identifies an advantage associated with including the multiple experience listings in the first user profile page 300 (such as increasing the possibility or receiving messages regarding career opportunities).

As described above, the user profile pages 300 and 400 are merely exemplary, and while the user profile pages 300 and 400 include experience sections and educations sections, these sections may be supplemented or replaced by other sections/fields (e.g., an art portfolio section/field, a music portfolio section/field, a photography portfolio section/field, a multimedia section/field, and so forth). For example, FIG. 8 illustrates an example of another user profile page 800 of another user (e.g., a LinkedIn® page of a user "Jim Oscar"), including identification information 801, photo area 802 with a photo of the user, an experience section 811, and an education section 821, and a portfolio section 831 that includes multiple portfolio listings 832. Thus, if the first user Jane Doe is viewing the user profile page 800 of the user Jim Oscar, the determination module 202 may determine that the user profile page 800 includes the portfolio section 831, while the first user profile page 300 does not include a portfolio section. Accordingly, as illustrated in FIG. 8, the prompt generation module 204 may generate the prompt 850 and display the prompt 850 over the user profile page 800. The prompt 850 identifies the portfolio section 831 and/or portfolio listings 832 that are not present in the first user profile page 300.

Thus, according to the aspects of this disclosure, whenever a user is viewing another profile page that is in some way better than their own profile page, a prompt is superimposed over the other profile page being viewed, in order to encourage the user to update their own profile page. Since the prompt refers to the other profile page which is already being viewed by the user, the prompt may be extremely effective at encouraging the user to update their own profile, by highlighting points of comparison between the other profile page being viewed and the user's own profile page, such as a specific part of the other profile page being viewed that is missing from the user's own profile page. Thus, the aspects of this disclosure may be applied by social and professional networking websites to promote profile completeness among users of the websites.

Figure 9:
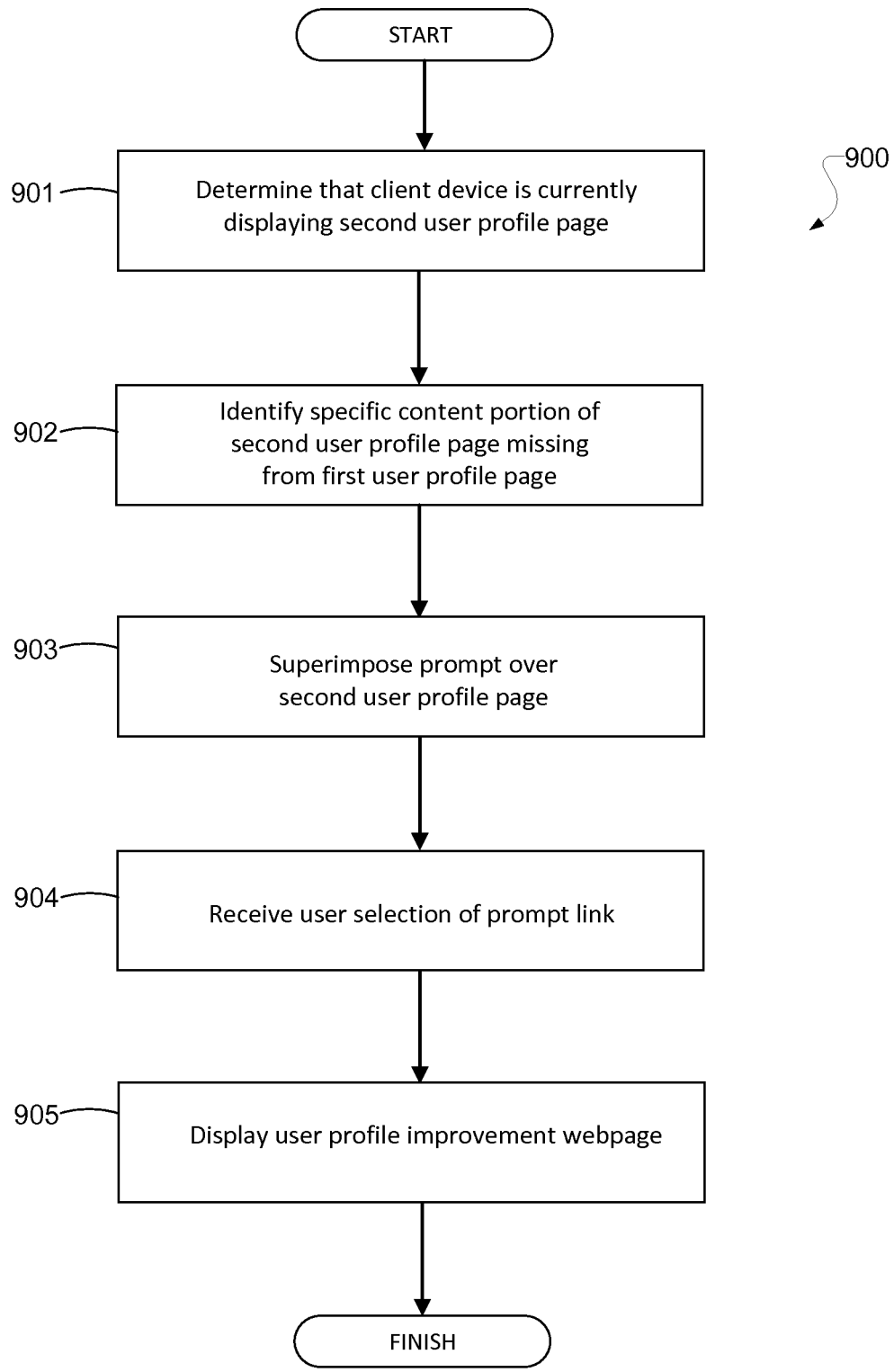
FIG. 9 is a flowchart illustrating an example method, according to various embodiments.

FIG. 9 is a flowchart illustrating an example method 900, according to various embodiments. The method 900 may be performed at least in part by, for example, the user profile improvement system 200 illustrated in FIG. 2 (or a user profile improvement apparatus having similar modules, such as client machines 110 and 112 or application server 112 illustrated in FIG. 1). In 901, the determination module 202 determines that a client device corresponding to a first user associated with a first user profile page (e.g., user profile page 300 illustrated in FIG. 3) is currently displaying a second user profile page (e.g., user profile page 400 illustrated in FIG. 4) associated with a second user. In 902, the determination module 202 identifies a specific content portion of the second user profile page that is missing from the first user profile page. In 903, the prompt generation module 204 superimposes a prompt over the second user profile page being displayed by the client device, where the prompt invites the first user to update the first user profile page based on the second user profile page (see FIGS. 5-8). For example, the prompt may invite the first user to update their first user profile page by including a reference to the aforementioned specific content portion (that was determined by the determination module 202 to be missing from the first user profile page in 902). Instead, or in addition, the prompt may include a reference to the second user, to the second user profile page generally, or to any part of the second user profile page. In 904, the prompt generation module 204 receives a selection by the first user of a reference link included in the displayed prompt. In 905, the prompt generation module 204 displays a user profile edit page or user profile improvement wizard that allows the first user to edit their own profile page (e.g., by editing the first user profile page to include the specific content portions that were determined to be missing from the first user profile page in 902).

Figure 10:
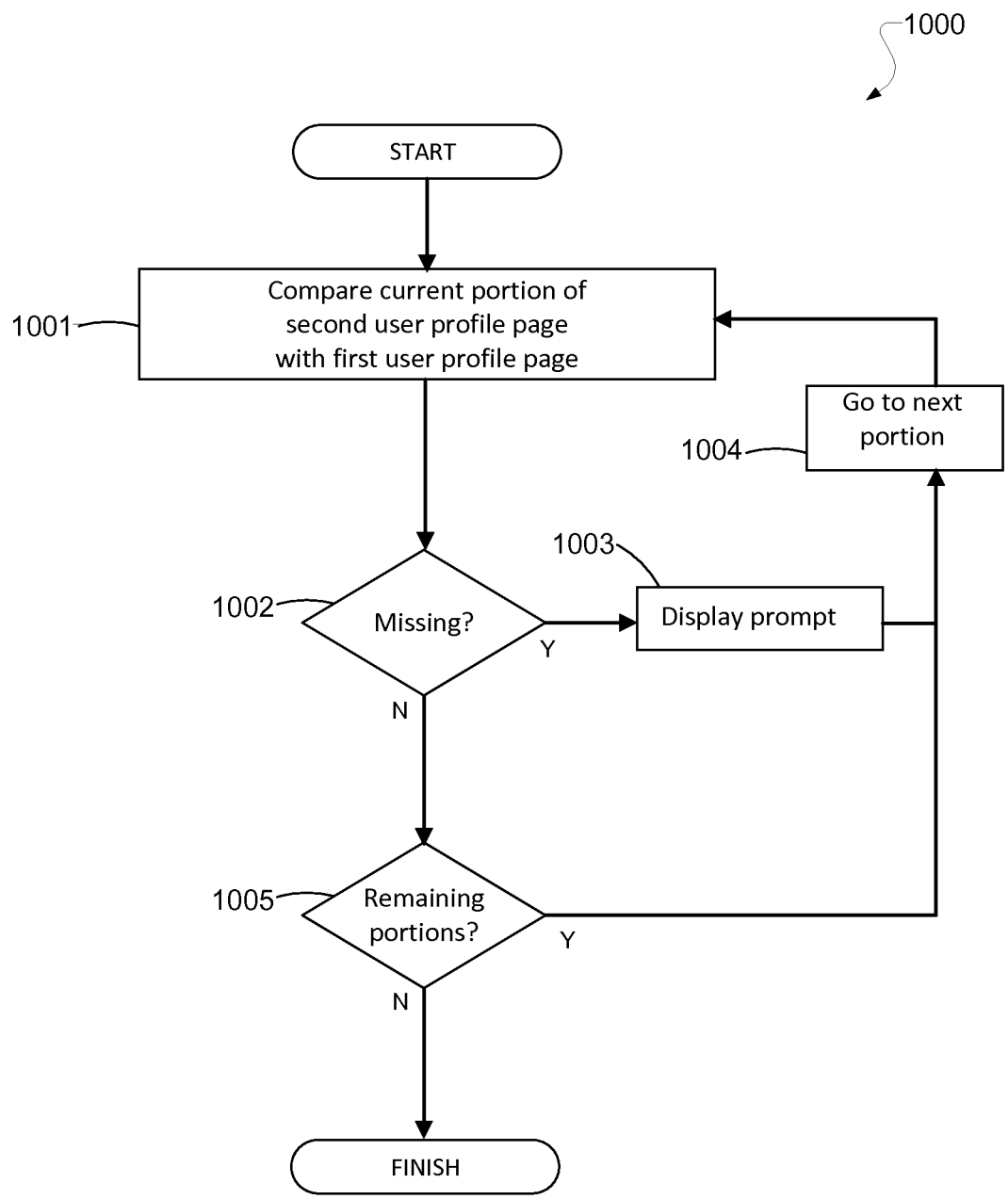
FIG. 10 is a flowchart illustrating an example method, according to various embodiments.

FIG. 10 is a flowchart illustrating an example method 1000, according to various embodiments. The method 1000 and may correspond to, for example, operation 902 in the method 900 illustrated in FIG. 9. The method 1000 may be performed at least in part by, for example, the user profile improvement system 200 illustrated in FIG. 2 (or an apparatus having similar modules, such as client machines 110 and 112 or application server 112 illustrated in FIG. 1). In 1001, the determination module 202 compares a current portion of a second user profile page with a first user profile page. A portion of a user profile page may correspond to any part of the content of the user profile page, such as an identification area, a photo area, a particular section/field, a listing of a particular section/field, etc. In 1002, the determination module 202 determines whether the current portion of the second user profile page is missing from the first user profile page. For example, the determination module 202 may determine a portfolio section is not included in the first user profile page, or that education listings are not included in the education section of the first user profile page, or that multiple experience listings are not included in the experience section of the first user profile page, and so forth.

If (1002, Y), then in 1003 the prompt generation module 204 displays the prompt described in various embodiments, and in 1004 the determination module 202 looks for the next portion of the second user profile page, which becomes the current portion and the flow returns to 1001. If (1002, N), then in 1005 the determination module 202 determines whether there are any remaining portions in the second user profile page (e.g., an identification area, a photo area, a particular section/field, a listing of a particular section/field, etc) that have not been checked. If (1005, Y), then in 1004 the determination module 202 looks for the next portion of the second user profile page, which becomes the current portion, and the flow returns to 1001. If (1005, N), then the flow ends.

According to another exemplary embodiment, the prompt may be superimposed over the second user profile page being viewed by a first user, when the second user profile page is in some way a more "complete" or "successful" profile page than the first user profile page of the first user. More specifically, the determination module 202 may be configured to classify a given user profile page as either an "incomplete" profile page or a "complete" profile page, based on the content of the profile page.

For example, the determination module may classify a given user profile page (e.g., user profile page 400 illustrated in FIG. 4) as incomplete or compete, based on the number of experience listings included in the user profile page (e.g., listings 412 and 413 included in the experience section 411 of user profile page 400); a number of education listings included in the user profile page (e.g, education listing 422 included in the education section 421 of user profile page 400), and/or a number of photographs included in the user profile page (e.g., photograph 402 in the user profile page 400). As described above, while the user profile pages 300 and 400 include experience sections and educations sections, these sections or fields may be supplemented or replaced by other sections or fields (e.g., an art portfolio section/field, a music portfolio section/field, a photography portfolio section/field, a multimedia section/field, and so forth). Thus, the determination module 202 may classify a given user profile page as incomplete or complete based on, for example, listings or content associated with other sections or fields in the user profile page.

Figure 11A:
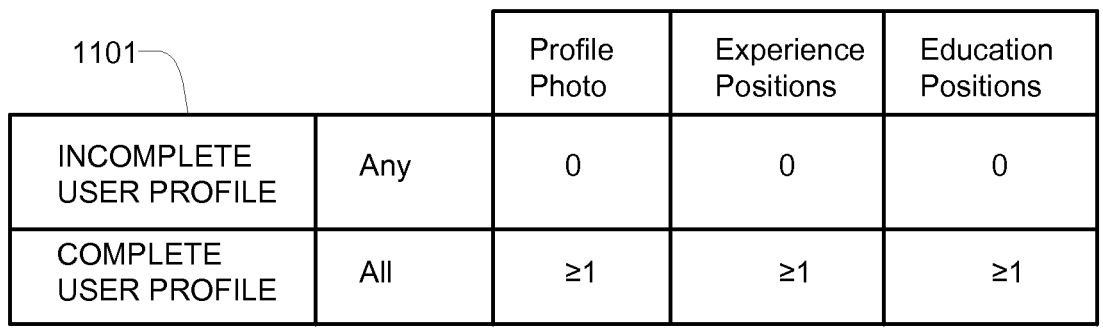
FIGS. 11a and 11b illustrate examples of data structures containing information that defines whether a profile page is to be classifies as incomplete or complete, according to various exemplary embodiments.

According to various exemplary embodiments, the determination module 202 may classify a user profile page as either incomplete or complete, by accessing user profile page completeness information that defines the criteria of an incomplete profile page and a complete profile page. For example, FIG. 11a illustrates an example of a table 1101 or similar data structure that defines the criteria of an incomplete profile page and a complete profile page. According to the information in table 501, a user profile page is incomplete if it satisfies any of three conditions: the user profile page does not include any photographs, the user profile page does not include any experience positions, or the user profile page does not include any education positions. In contrast, according to the information in table 1101, a user profile page is complete if it satisfies all of three conditions: the user profile page includes at least one photograph, the user profile page includes at least one experience position, and the user profile page includes at least one education position.

For example, based on the user profile page completeness information in table 1101, the determination module 202 will determine that the user profile page 300 illustrated in FIG. 3 is an incomplete user profile, since the user profile page 300 satisfies at least one of three "incomplete" conditions in table 1101—i.e., the user profile page 300 does not include any photographs (e.g., no photograph in the photo area 302), and moreover the user profile page 300 does not include any education positions (e.g., no education positions in the education area 321). In contrast, based on the user profile page completeness information in table 1101, the determination module 202 will determine that the user profile page 400 illustrated in FIG. 4 is a complete user profile, since the user profile page 400 satisfies all of the three "complete" conditions in table 1101—i.e., the user profile page includes at least one photograph 402, the user profile page 400 includes at least one experience position (e.g., experience listings 412 and 413 in experience section 411), and the user profile page 400 includes at least one education position (e.g., education position 422 in education section 421). The determination module 202 may make the aforementioned determinations based on the content of the user profile pages by, for example, analyzing database records in profile database 206 that contain user profile data associated with each user or each user profile page.

Figure 11B:
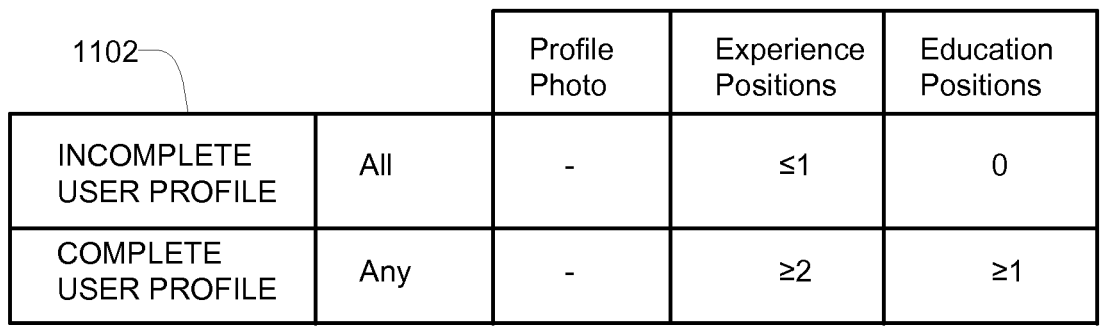

The information in table 1101 is merely exemplary, and other information may be used to classify a user profile page as either complete or incomplete. For example, FIG. 11b illustrates an example of a table 1102 or similar data structure that defines another set of criteria of an incomplete profile page and a complete profile page. According to the information in table 1102, a user profile page is incomplete if it satisfies both the following conditions: the user profile page includes at most one experience position, and the user profile page does not include any education positions. In contrast, according to the information in table 1102, a user profile page is complete if it satisfies any of the following two conditions: the user profile page includes at least two experience positions, or the user profile page includes at least one education position. Thus, it is clear that many other examples of user profile page completeness information may be utilized, such as user profile page completeness information referring to listings associated with an art portfolio section/field, a music portfolio section/field, a photography portfolio section/field, a multimedia section/field, and other portions of a user profile page.

Figure 11C:
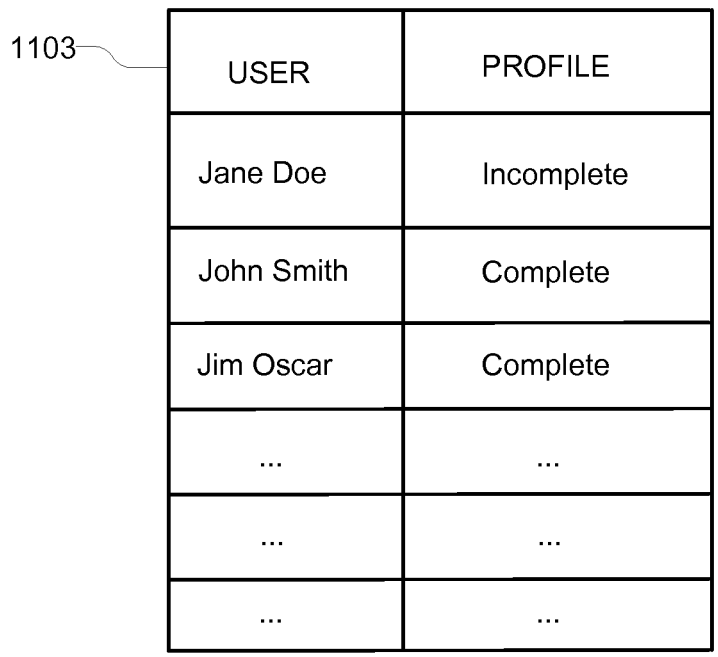
FIG. 11c illustrates an example of a data structure containing member base profile completeness information, according to various exemplary embodiments.

According to another exemplary embodiment, the determination module 202 may classify a given user profile page as either an incomplete profile page or a complete profile page, by accessing pre-existing member base profile completeness information. For example, FIG. 11c illustrates exemplary member base profile completeness information 1103 that identifies multiple users of the networking website (e.g., all or a subset of the member base of the networking website), and may further describe whether each user profile page associated with each of the users is complete or incomplete. For example, the determination module 202 may have generated the pre-existing member base profile completeness information 1103 ahead of time (e.g., while the first user is off-line and/or before the first user utilizes the client device to view the second user profile page of the second user). Further, the member base profile completeness information may be updated by the determination module 202 at regular time intervals, even if the various users of the networking website are off-line. The determination module 202 may generate the member base profile completeness information by, for example, analyzing the user profile pages (or database records in profile database 206 that contain user profile data associated with each user or each user profile page).

Thus, if the determination module 202 later determines that the first user is online and is viewing the second user profile page associated with the second user, the determination module 202 may access the pre-existing member base profile completeness information 1103, and identify entries for the first user and the second user in the member base profile completeness information 1103. The determination module 202 may determine that the first user profile page is incomplete and the second user profile page is complete, if the entry for the first user indicates that the first user profile page is incomplete, and if the entry of the second user indicates that the second user profile page is complete.

After the determination module 202 determines that a first user associated with an incomplete first user profile page (e.g., user profile page 300 illustrated in FIG. 3) is viewing the complete second user profile page (e.g., user profile page 400 illustrated in FIG. 4) of a second user, the prompt generation module 204 superimposes a prompt over the complete second user profile page being viewed by the first user, as described in various embodiments throughout this disclosure. In particular, the prompt invites or encourages the first user to update their first user profile page, based on the complete second user profile page.

Figure 12:
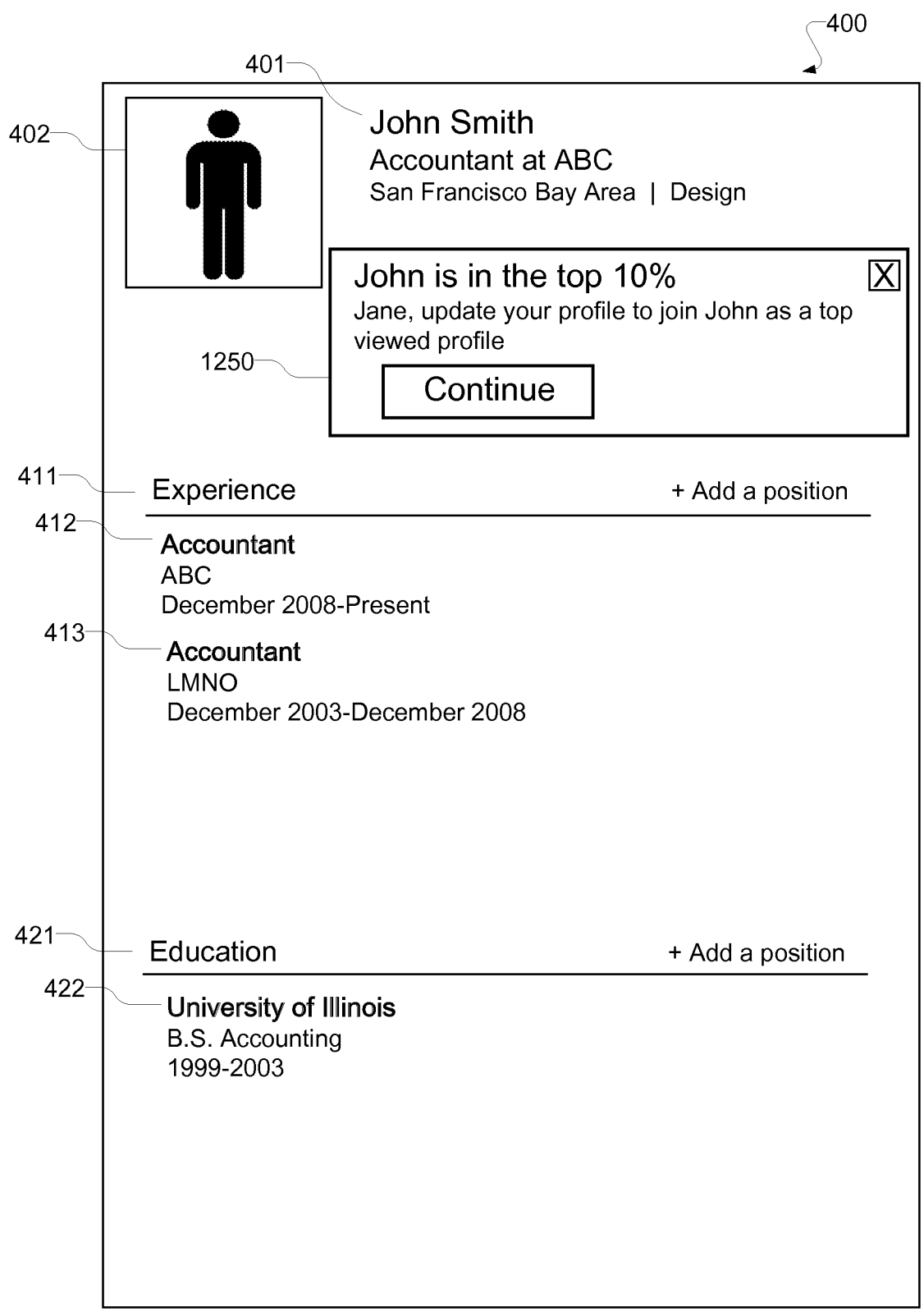
FIGS. 12-15 illustrate example portions of user profile pages with prompts superimposed thereon, according to various embodiments.

For example, FIG. 12 illustrates the second user profile page 400 which is substantially similar to second user profile page 400 illustrated in FIG. 4. If the first user Jane Doe associated with the first user profile page 300 is currently viewing the second user profile page 400 associated with the second user John Smith, then as illustrated in FIG. 12, the prompt generation module may superimpose the prompt 1250 over the second user profile page 400. The prompt 1250 invites the first viewing user Jane Doe to update her profile so that it is in some way more similar to John Smith's profile that is currently being viewed by Jane Doe. If the user Jane Doe decides to proceed with updating her user profile, the user may click on a button within the prompt (e.g., "Continue") that includes a reference link to a profile edit webpage/wizard, and the user will be presented with the profile edit webpage/wizard that will allow the user to edit their own profile page (and may include specific instructions or suggestions regarding how the user can update their own profile page).

As illustrated in FIG. 12, the prompt 1250 also encourages the first user Jane Doe to edit her own profile page by displaying a ranking associated with the second user profile page 400. For example, the ranking (e.g., "top 10%") may be a ranking of all the user profile pages of the social networking website, based on, for example, a view count associated with each profile page, a completeness ranking of each profile page, a search visibility ranking of the profile page in search results (e.g., how "high" does the profile page appear in search results based on a search of the user of the profile page), a number of messages transmitted to the user of each profile page, a number of likes, follows or shares associated with each profile page, a number of connections, acquaintances, colleagues, friends, followers, etc., of the user of each profile page, and so forth.

Figure 13:
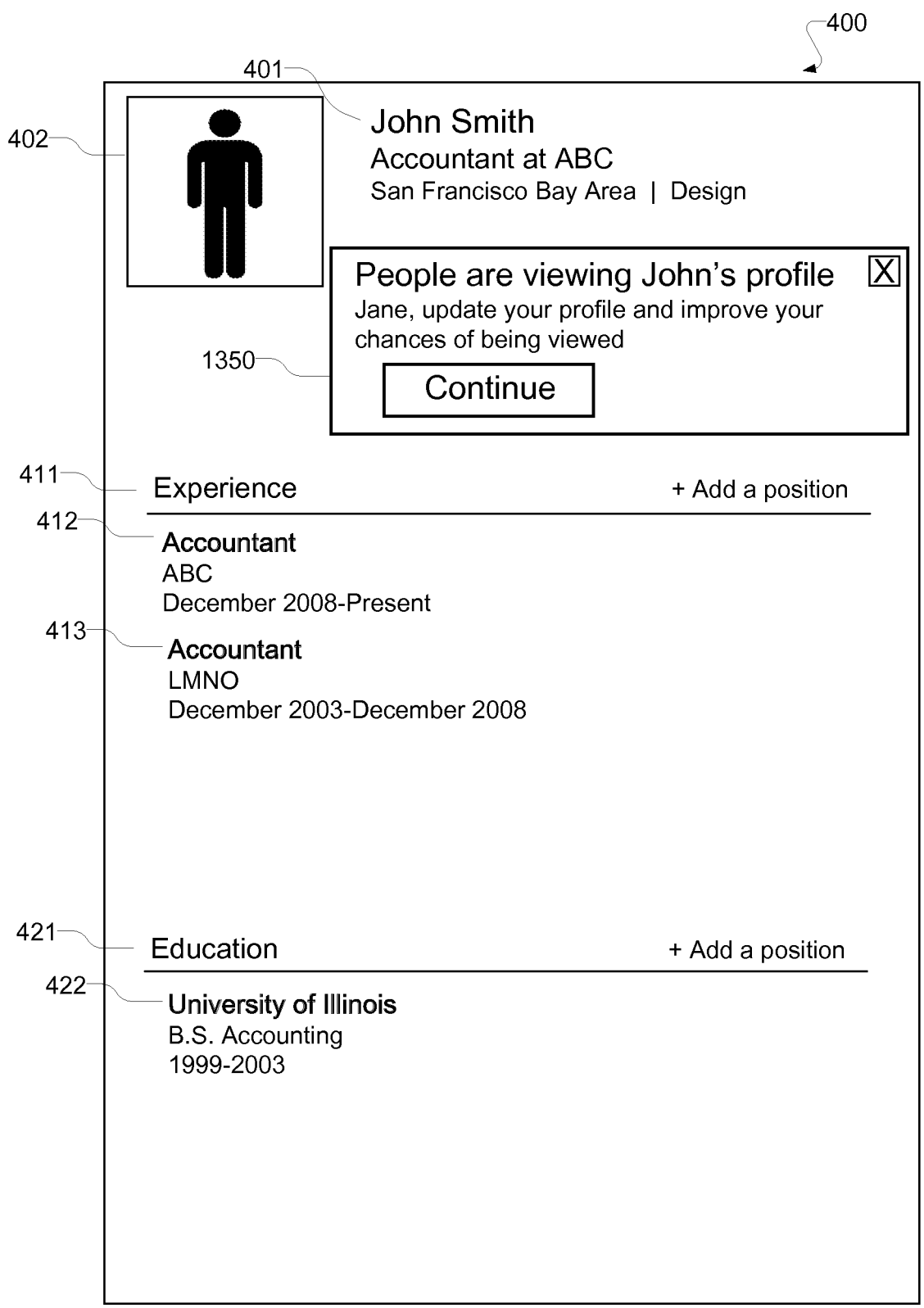
Figure 14:
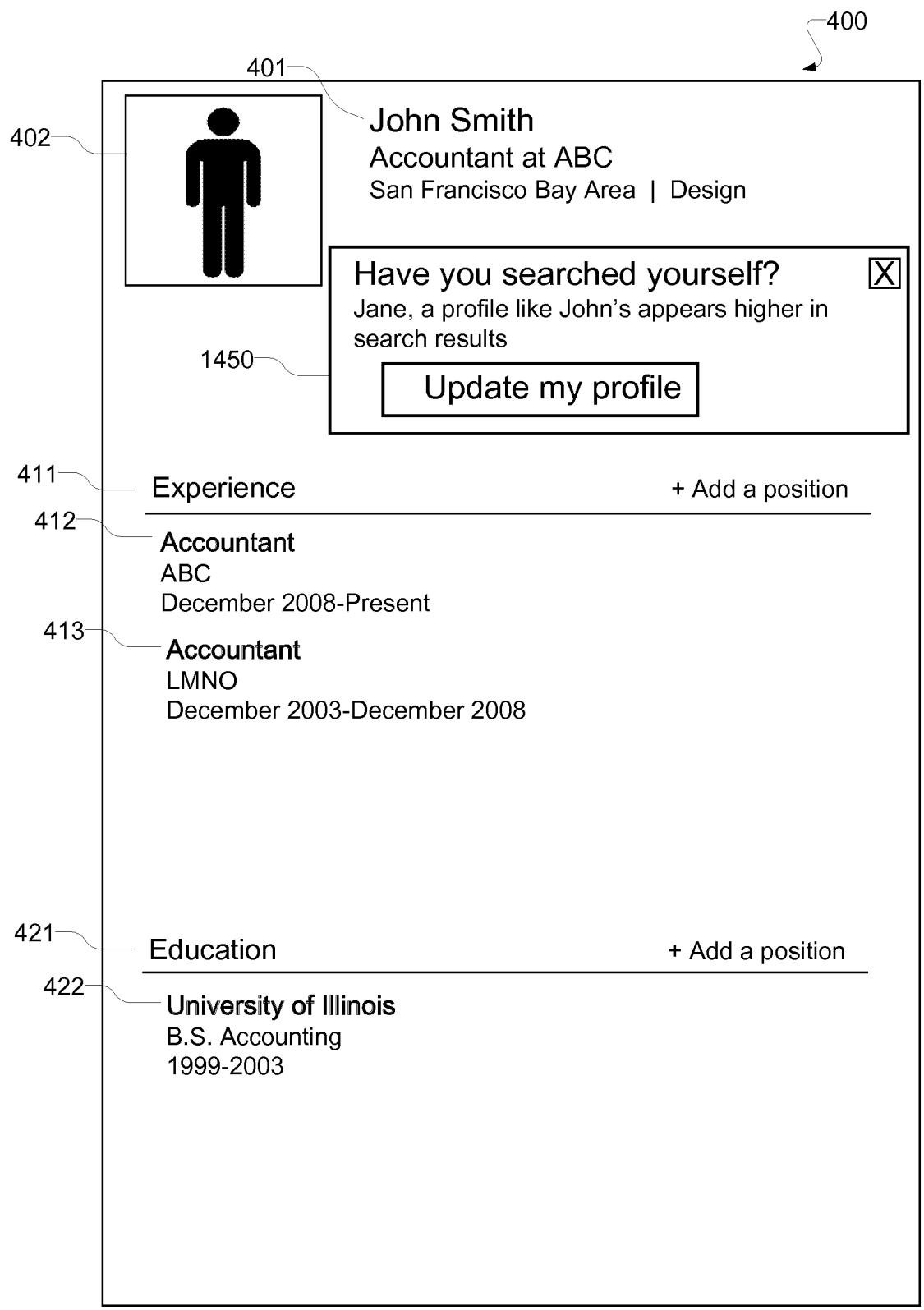
Figure 15:
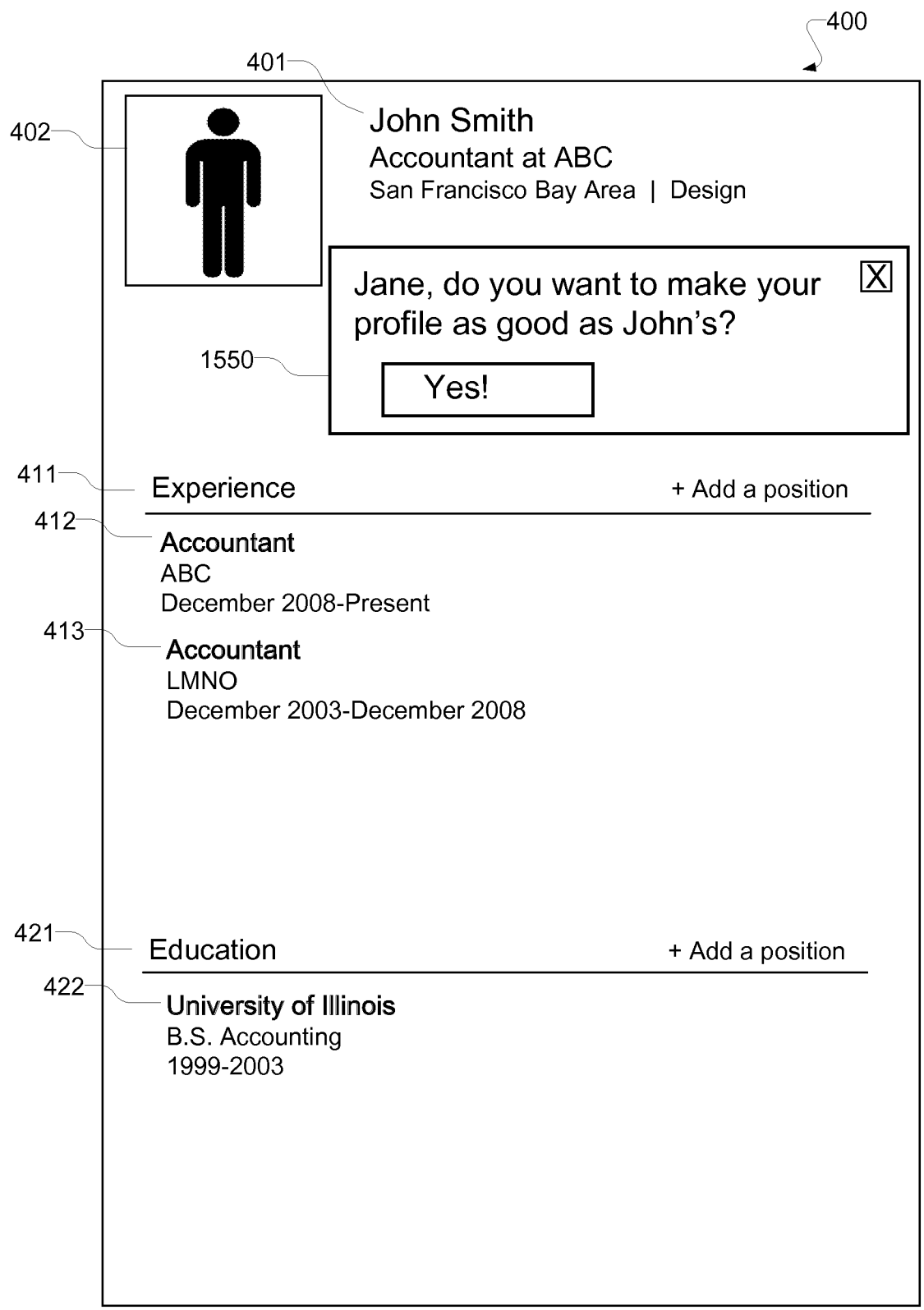

Moreover, as illustrated in FIG. 12, the prompt 1250 also encourages the first user Jane Doe to edit her own profile page by displaying an advantage associated with the second user profile page and/or an advantage associated with modifying the first user profile page to make it more similar to the second user profile page. For example, the prompt 1250 suggests that, by modifying the first user profile page to make it more similar in some manner to the second user profile page, the first user profile page 300 may become a "top viewed profile" having a high view count. As another example, FIG. 13 illustrates user profile page 400 that is substantially similar to the second user profile page 400 illustrated in FIG. 4. Moreover, as illustrated in FIG. 13, a prompt 1350 is superimposed over the second user profile page 400. The prompt 1350 indicates that the second user profile page 400 has a high view count, and suggests that, by modifying the first user profile page to make it more similar in some manner to the second user profile page, the first user profile page 300 may also have a high view count and have improved chances of being viewed. As yet another example, FIG. 14 illustrates user profile page 400 that is substantially similar to the second user profile page 400 illustrated in FIG. 4. Moreover, as illustrated in FIG. 14, a prompt 1450 is superimposed over the second user profile page 400. The prompt 1450 indicates that the second user profile page 400 appears higher in search results, and suggests that, by modifying the first user profile page to make it more similar in some manner to the second user profile page, the first user profile page 300 may appear higher or more prominently in search results. As yet another example, FIG. 15 illustrates user profile page 400 that is substantially similar to the second user profile page 400 illustrated in FIG. 4. Moreover, as illustrated in FIG. 15, a prompt 1550 is superimposed over the second user profile page 400. The prompt 1550 indicates that the second user profile page 400 is more complete or is otherwise in a better condition than the first user profile page, and includes a competitive tone to encourage the first user to modify the first user profile page to make it "as good as" the second user profile page.

According to this exemplary embodiment, the prompt displayed by the prompt generation module 204 may indicate a specific content portion of the complete second user profile page that is missing from the incomplete first profile page, and may be displayed near the specific content portion of the complete second user profile page, as described above in various exemplary embodiments above in connection with FIGS. 3-8. For example, after the determination module 202 determines that a first user (e.g., user Jane Doe in FIG. 3) associated with an incomplete first user profile page (e.g., user profile page 300 illustrated in FIG. 3) is viewing the complete second user profile page (e.g., user profile page 400 illustrated in FIG. 4) of a second user (e.g., user John Smith in FIG. 4), the determination module may determine specific content portions that are missing from the first user profile page 300 that contribute to the first user profile page being classified as an incomplete profile page, such as the missing photo in photo area 302 or the missing education listings in education area 321. If the second user profile page 400 being viewed by the first user is classified as a complete profile page, it will generally include specific content portions that are missing for the first user profile page, such as a photo 402 and education listing 422 in education area 421.

Thus, according to the aspects of this disclosure, when a user with an incomplete or weak profile page is viewing a stronger, more complete profile page of another user such as a friend, a prompt is superimposed over the friend's profile page to encourage the user to update their own profile page. Since the prompt refers to the friend or the friend's profile page, which is already being viewed by the user, the prompt may be very effective at encouraging the user to update their own profile, by highlighting points of comparison between the stronger, more complete profile of the friend and the user's own profile page. Thus, the aspects of this disclosure may be applied by social and professional networking websites to promote profile completeness among users of the websites.

Figure 16:
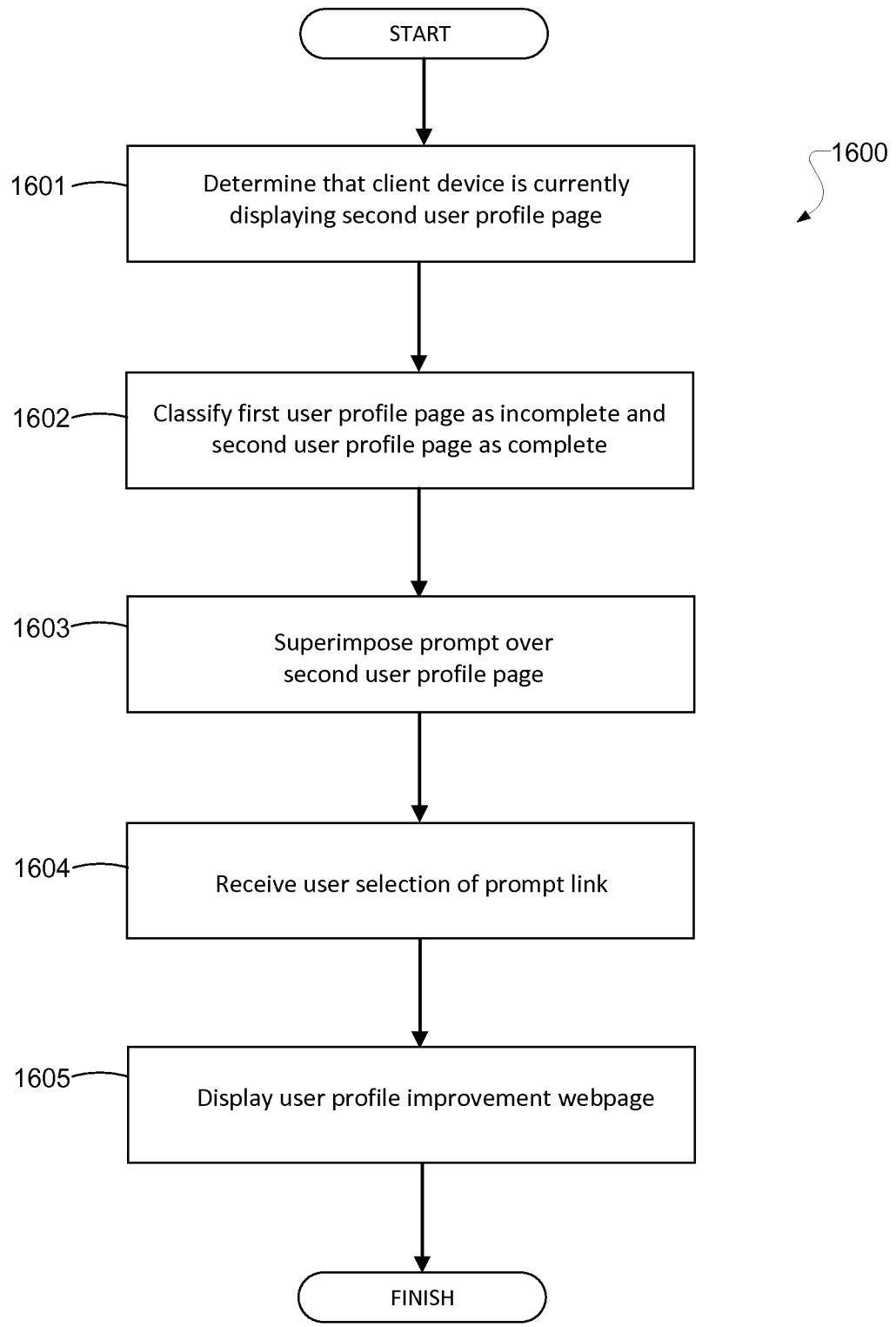
FIG. 16 is a flowchart illustrating an example method, according to various embodiments.

FIG. 16 is a flowchart illustrating an example method 1600, according to various embodiments. The method 1600 may be performed at least in part by, for example, the user profile improvement system 200 illustrated in FIG. 2 (or a user profile improvement apparatus having similar modules, such as client machines 110 and 112 or application server 112 illustrated in FIG. 1). In 1601, the determination module 202 determines that a client device corresponding to a first user associated with a first user profile page (e.g., user profile page 300 illustrated in FIG. 3) is currently displaying a second user profile page (e.g., user profile page 400 illustrated in FIG. 4) associated with a second user. In 1602, the determination module 202 classifies the first user profile page as incomplete and the second user profile page as complete. According to an exemplary embodiment, the determination module 202 may make these classifications based on content of the first user profile page and content of the second user profile page. According to another exemplary embodiment, the determination module 202 may make these classifications based on pre-existing member base profile completeness information (e.g., see FIG. 11c). In 1603, the prompt generation module 204 superimposes a prompt over the second user profile page being displayed by the client device, where the prompt invites the first user to update the first user profile page based on the second user profile page (see FIGS. 5-8 and 12-15). The prompt may include a reference to the second user, to the second user profile page generally, or to any part of the second user profile page. In 1604, the prompt generation module 204 receives a selection by the first user of a reference link included in the displayed prompt. In 1605, the prompt generation module 204 displays a user profile edit page or user profile improvement wizard that allows the first user to edit their own profile page.

It is possible that the method 1600 may be modified by including the operation 902 (of FIG. 9) therein. For example, the operation 902 (where the determination module 202 identifies a specific content portion of the second user profile page that is missing from the first user profile page) may be performed between 1602 and 1603. In such case, the prompt displayed in 1603 may identify the specific content portion of the second user profile page, and/or may be displayed proximate to the specific content portion of the second user profile page, and/or may identify an advantage associated with the specific content portion of the second user profile page, as described above in various exemplary embodiments.

According to further exemplary embodiments described in more detail below, a prompt may be displayed when a user is viewing a user profile page of another person that is on the same career track as the user. Since the prompt may refer to the common career track, the prompt may be more particularly targeted at the viewing user, resulting in a greater chance of encouraging the viewing user to update their own profile page.

Figure 17:
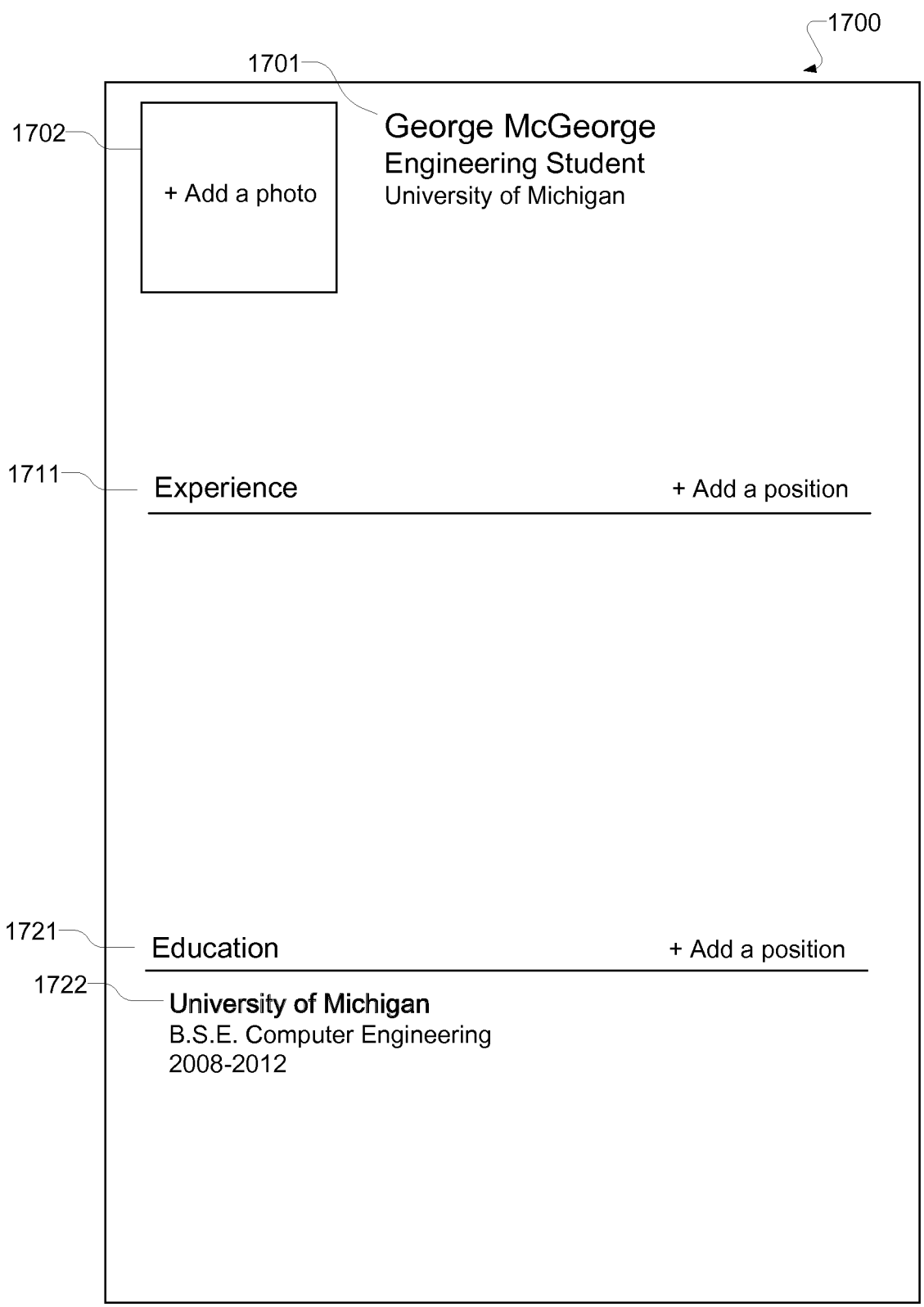
FIG. 17 illustrates an example portion of a user profile page, according to various embodiments.

For example, FIG. 17 illustrates a first user profile page 1700 of a first user George McGeorge, that includes identification information 1701, a photo area 1702, an experience section 1711 configured to display listings of experience positions of the user, and an education section 1721 including listings of educational credentials of the user (e.g., listing 1722). Moreover, FIG. 18 illustrates a second the user profile page 1800 of a second user Dave Davidson, that includes identification information 1801, a photo area 1802, an experience section 1811 configured to display listings of experience positions of the user (e.g., experience listings 1812 and 1813), and an education section 1821 including listings of educational credentials of the user (e.g., education listing 1822).

The determination module may first identify a specific content portion of the second user profile page 1800 that is missing from the first user profile page 1700, as described previously in accordance with various embodiments. For example, the determination module 202 may determine that the user profile page 1800 includes a photograph 1802 and experience listings 1812, 1813, whereas user profile page 1700 illustrated in FIG. 17 does not include such content. Instead, or in addition, the determination module 202 may determine that the first user profile page is incomplete and the second user profile page is complete based on the content of the first and second user profile pages, as described previously in accordance with various embodiments. For example, the determination module 202 may determine that the user profile page 1700 of McGeorge is incomplete because it lacks a photo 1702 or any experience listings in experience section 1711, whereas the user profile page 1800 of Davidson is complete because it includes a photo 1802, a experience section 1811 with listings 1812 and 1813, and an education section 1821 with education listings 1822. For example, the determination module 202 may access the user profile page completeness information in table 1101 illustrated in FIG. 11a, in order to determine whether a user profile page is incomplete or complete. As another example, the determination module 202 may access pre-existing member base profile completeness information (e.g., see FIG. 11c) in order to make the determination.

Thereafter, the determination module 202 is configured to determine that the first user George McGeorge and the second user Dave Davidson are on the same specific career track. As described in this disclosure, a "specific career track" may refer to any career track that may be associated with one or more users or user profiles. For example, career tracks may be defined broadly and in general terms (e.g., Artist, Doctor, Engineer, Programmer, etc.), or may be defined in more specific terms by taking into account the occupation of the user, the work positions/rank of the user, the education of the user, the location of the user, and other factors (e.g., Doctor—Harvard Medical School, Computer Engineer—University of Michigan, Electrical Engineer—San Francisco Bay Area, Consultant—New York, N.Y., etc.). Thus, it should be understood that the career tracks may be defined broadly and are not limited to the simple examples describe here. The determination module 202 may determine whether two or more users are on a specific career track, based on any information included in a user's profile page, such as the user's educational information, work experience information, age, location, skills, activities, resume, art portfolio information, music portfolio information, photography portfolio information, multimedia information, etc. As seen in FIGS. 17 and 18, the two users George McGeorge and Dave Davidson both having degrees in "Computer Engineering" from the University of Michigan (see education listings 1722 and 1822 in education areas 1721 and 1821, respectively). Thus, the determination module 202 may determine that the users McGeorge and Davidson are both on the specific career track of "Computer Engineering—University of Michigan".

Figure 19:
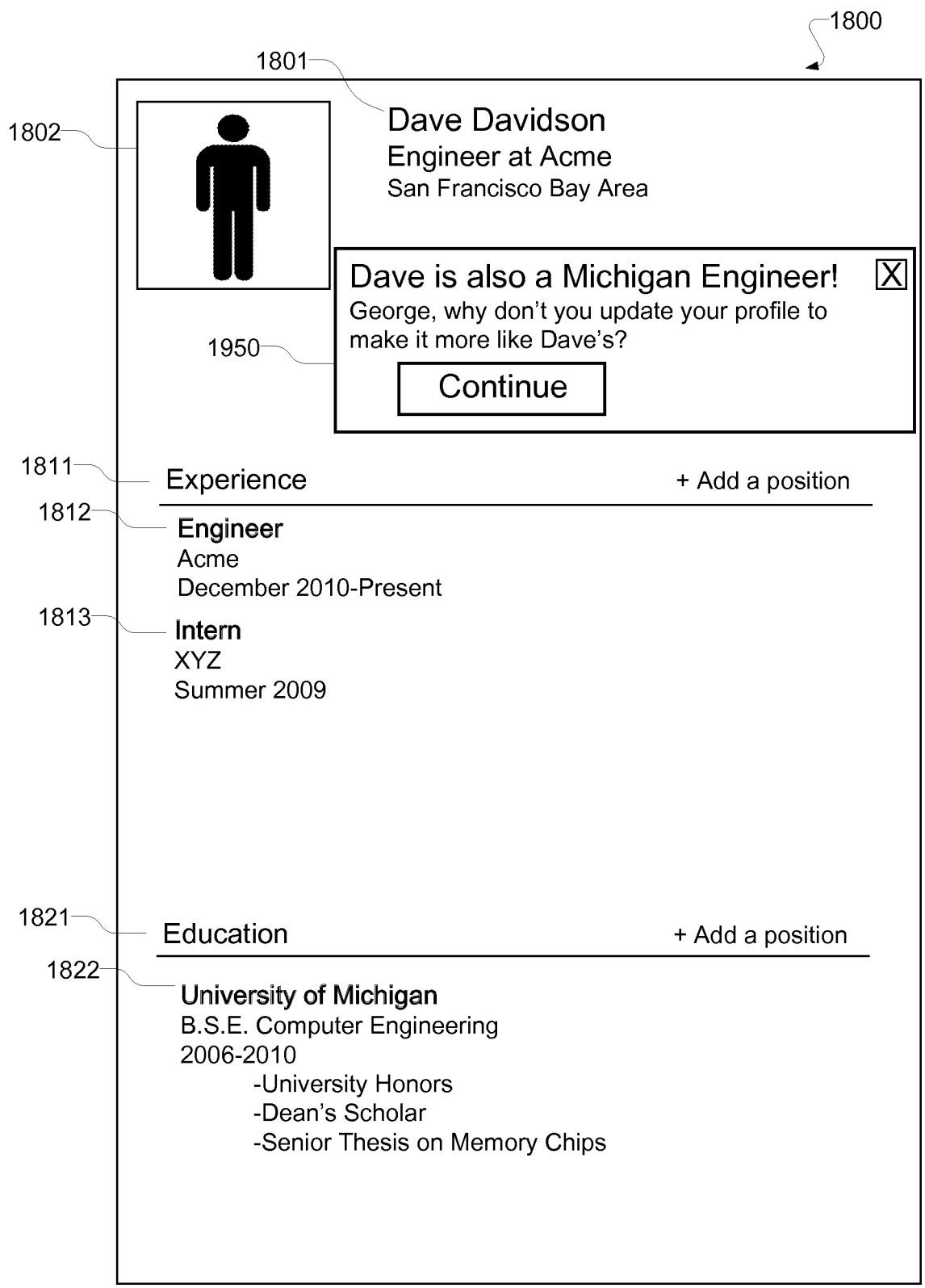
FIG. 19 illustrates an example portion of a user profile page with a prompt superimposed thereon, according to various embodiments.

Thereafter, the prompt generation module 204 may display a prompt over the second user profile page being viewed by the first user. The prompt may encourage the first user to update their profile page, by referring to the fact that the second user is on the same specific career track as the first user. For example, FIG. 19 illustrates a user profile page

1800 which is substantially similar to user profile page 1800 illustrated in FIG. 18. As illustrated in FIG. 19, the prompt generation module 204 may superimpose a prompt 1950 over the profile page 1800 of Dave Davidson that is being viewed by George McGeorge, wherein the prompt 1950 encourages the first user McGeorge to update their profile 1700 to make it more like Dave Davidson's profile page 1800, since Dave "is also a Michigan Engineer!". Thus, since the prompt is more particularly focused and targeted at the viewing user and their career, there may be a greater chance of encouraging the viewing user to update their own profile page.

Figure 20:
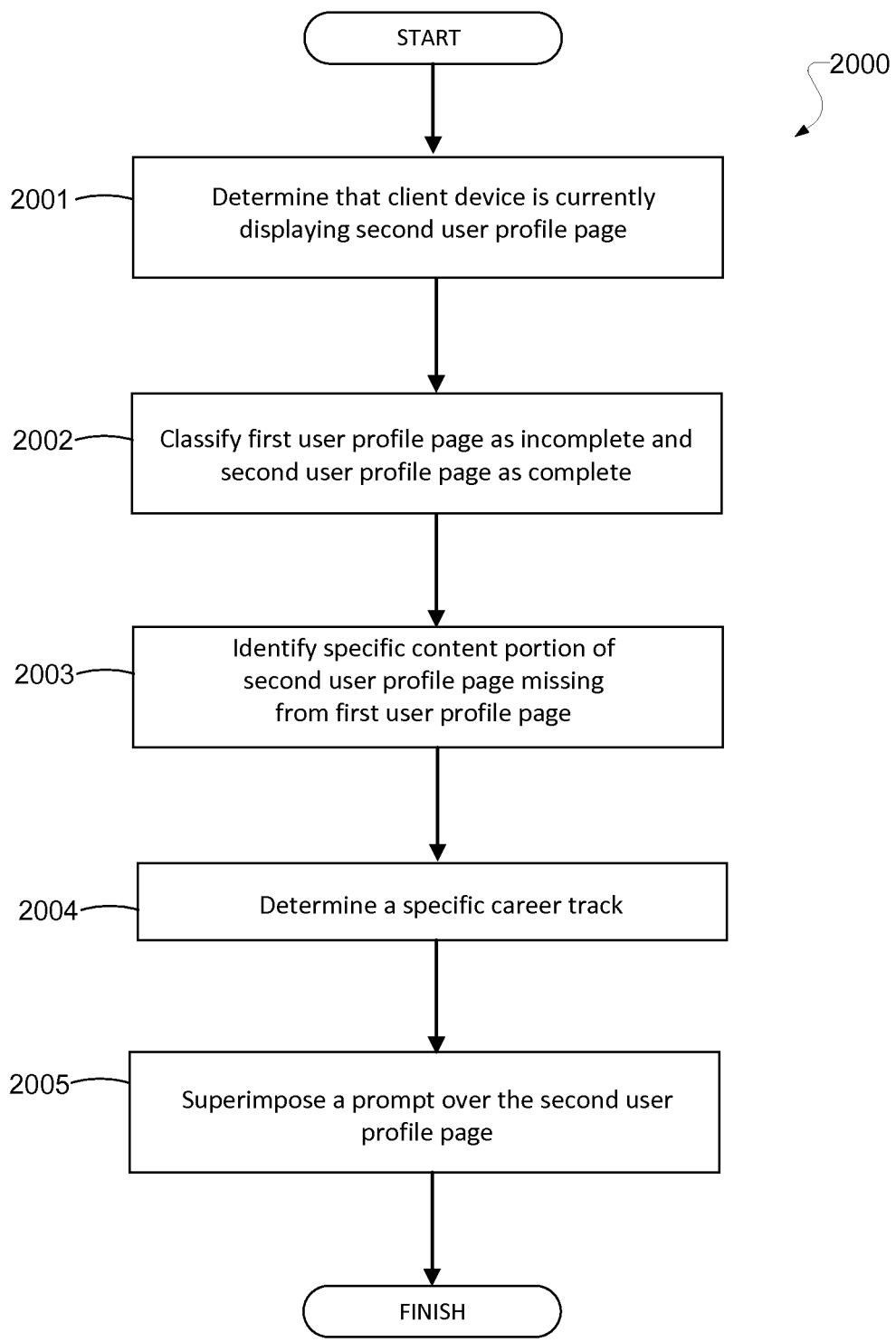
FIG. 20 is a flowchart illustrating an example method, according to various embodiments.

For example, FIG. 20 is a flowchart illustrating an example method 2000, according to various described embodiments. The method 2000 may be performed at least in part by, for example, the user profile improvement system 200 illustrated in FIG. 2 (or a user profile improvement apparatus having similar modules, such as client machines 110 and 112 or application server 112 illustrated in FIG. 1). In 2001, the determination module 202 determines that a client device corresponding to a first user associated with a first user profile page (e.g., user profile page 1700 illustrated in FIG. 17) is currently displaying a second user profile page associated with a second user (e.g., user profile page 1800 illustrated in FIG. 18). In 2002, the determination module 202 classifies the first user profile page as incomplete and the second user profile page as complete (e.g., based on content of the first user profile page and content of the second user profile page, or based on pre-existing member base profile completeness information). In 2003, the determination module 202 identifies a specific content portion of the second user profile page that is missing from the first user profile page. In 2004, the determination module 202 determines that the first and second user profile pages are associated with a specific career track (e.g., based on the content of the first and second user profile pages, or based on pre-existing member segment information). In 2005, the prompt generation module 204 generates a prompt and superimposes the prompt over the second user profile page, wherein the prompt invites the first user to update the first user profile page by referring to the specific career track determined in 2004. The prompt may include further references to the second user, to the second user profile page generally, or to any part of the second user profile page (e.g., the specific content portion identified in 2003). It is possible that the method 2000 and may be modified by excluding any one of 2002 and 2003.

As described above, the user profile improvement system 200 may display the prompt when a user is viewing a profile of another user on the same career track as the user. According to another embodiment, the prompt may be displayed when a user at an early stage of a specific career track is viewing a user profile page of another user at a later stage of the same specific career track. Thus, since the prompt may refer to someone more successful on the specific career track, the prompt may be more particularly targeted at the viewing user, resulting in a greater chance of encouraging the viewing user to update their own profile page.

For example, referring back to FIGS. 17 and 18, wherein first user profile page 1700 and the second user profile page 1800 belong to users on the same specific career track, as described above. The determination module may classify the first user profile page as a "beginner career track profile page" and the second user profile page as a "successful career track profile page". A beginner career track profile page refers to a profile of a user at an early stage of a specific career track, such as a user that is still in the process of earning their academic qualifications, or a user that has recently earned their academic qualifications. For example, with reference to FIG. 17, the determination module 202 may determine, based on the education listing 1722 of the user McGeorge, that the user is only just graduating from university and thus has a beginner career track profile. On the other hand, with reference to FIG. 18, the determination module 202 may determine, based on the education listing 1822 of the user Davidson, that the user graduated from university two years ago, and the determination module 202 may further determine, based on the experience position listing 1812, that the user is already currently employed at the ACME corporation. Moreover, the system may determine that the employer ACME is highly desirable employer for users in the specific career track, based on, for example, responses to user surveys, analysis of online articles, user input, data analytics of the user base, the quantity or content of comments, posts, views, messages, feedback, etc., associated with a profile page of ACME, and so forth. Thus, based on the aforementioned factors (including education listings and career listings), the determination module 202 may determine that the user Davidson has a successful career track profile, while user McGeorge has a beginner career track profile.

The determination module 202 may determine that a profile page is a beginner career track profile page or a successful career track profile page based on any information included in a user's profile page, such as the user's educational information, work experience information, age, location, skills, activities, resume, art portfolio information, music portfolio information, photography portfolio information, multimedia information, etc. The determination module 202 may also take other factors into account when determining that a profile is a successful career track profile, such as a view count associated with the user profile page, or how high the profile page appears in search results (e.g., a higher view count or search result visibility ranking may be indicative of a successful career track profile page, while a lower view count or search result visibility ranking may be indicative of a beginner career track profile page).

According to various exemplary embodiments, the determination module 202 may also determine that a given user is on a specific career track (and has a beginner career track profile or a successful career track profile on that career track) by accessing pre-existing member segment information. For example, the member segment information may identify multiple users of the networking website (e.g., all or a subset of the member base of the networking website), and may further describe whether each user is associated with a particular member segment, and/or whether the user profile pages of each of the users are beginner career track profiles or successful career track profiles. For example, the determination module 202 may have generated the member segment information ahead of time (e.g., while various users of the networking platform are offline). Further, the member segment information may be updated by the determination module 202 at regular time intervals, even if the various users of the networking website are off-line. The determination module 202 may generate the member segment information by, for example, analyzing the user profile pages (or database records in profile database 206 that contain user profile data associated with each user or each user profile page), as described above in connection with various aspects of the determination module 202.

Figure 21:
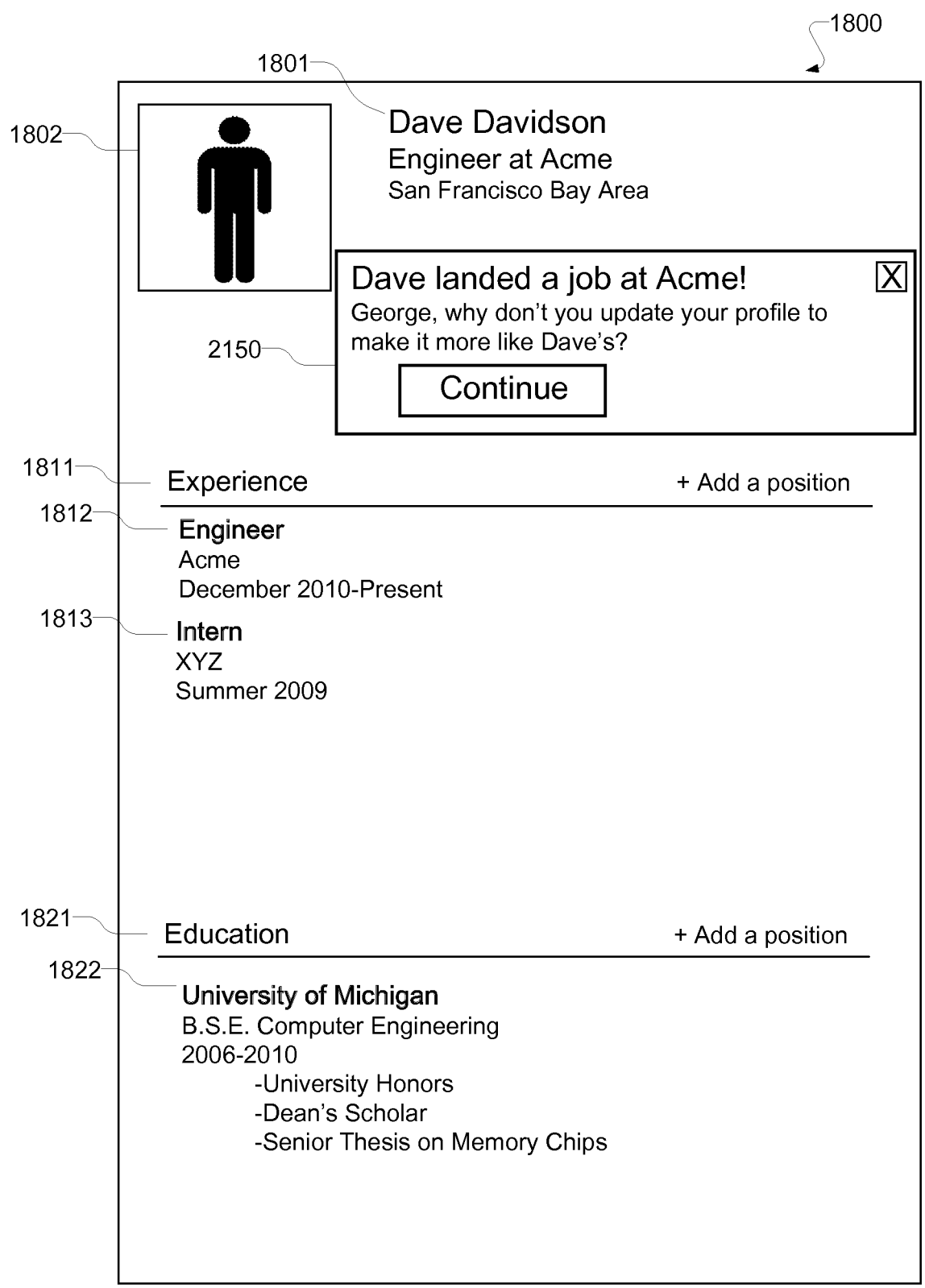
FIG. 21 illustrates an example portion of a user profile page with a prompt superimposed thereon, according to various embodiments.

Thereafter, the prompt generation module 204 is configured to display a prompt over the successful career track profile page being viewed by the first user associated with the beginner career track profile. The prompt may encourage the first user to update their profile page, by referring to the successful career track profile page of the second user. For example, FIG. 21 illustrates a user profile page 1800 which is substantially similar to user profile page 1800 illustrated in FIG. 18. As illustrated in FIG. 21, the prompt generation module 204 may superimpose a prompt 2150 over the profile page 1800 of Davidson that is being viewed by McGeorge, wherein the prompt 2150 encourages the first user George McGeorge to update their profile 1700 to make it more like Dave Davidson's profile page 1800, since Dave "landed a job at Acme." Thus, since the prompt is more particularly focused and targeted at the viewing user and their career, there may be a greater chance of encouraging the viewing user to update their own profile page.

Figure 22:
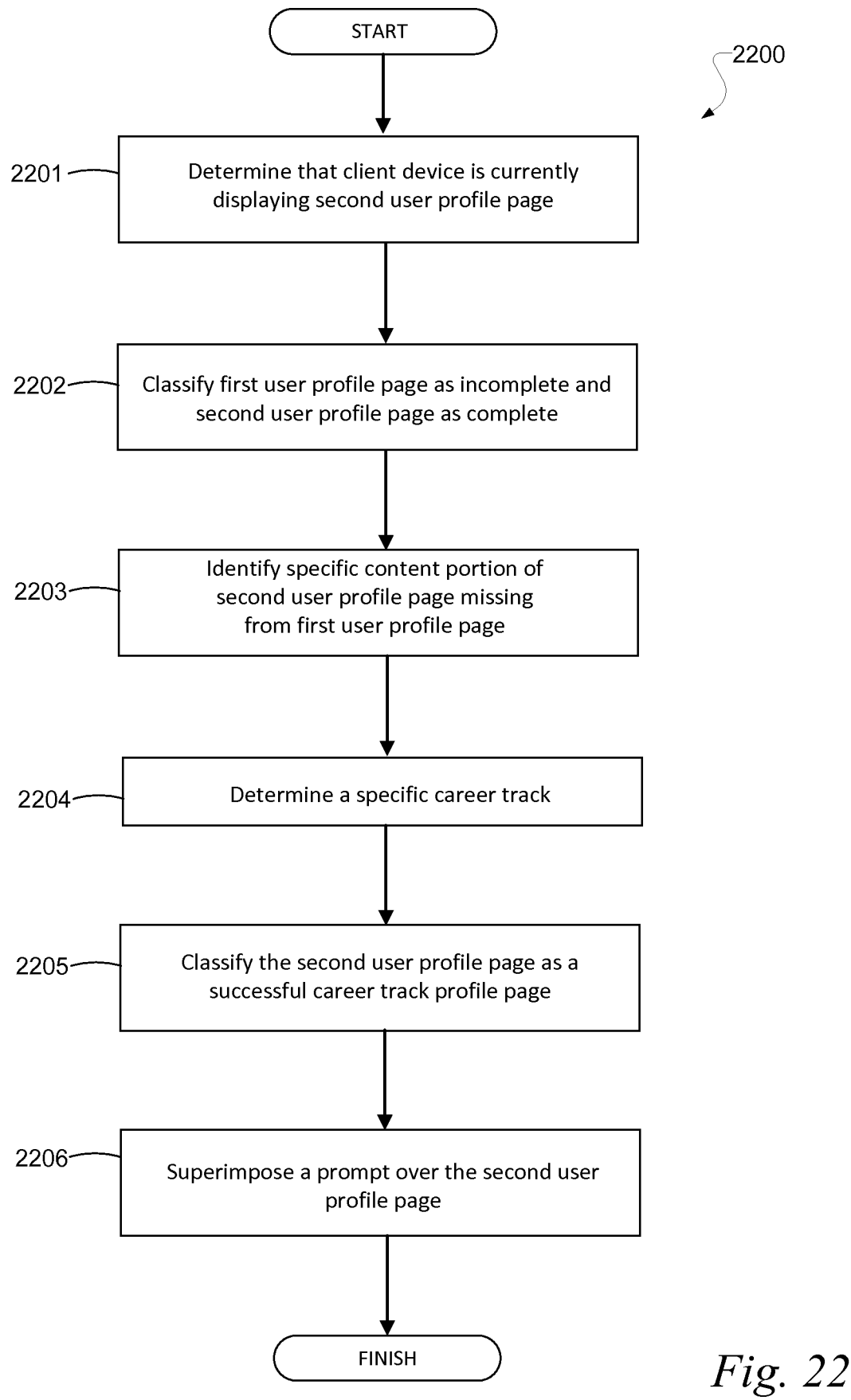
FIG. 22 is a flowchart illustrating an example method, according to various embodiments.

For example, FIG. 22 is a flowchart illustrating an example method 2200, according to various described embodiments. The method 2200 may be performed at least in part by, for example, the user profile improvement system 200 illustrated in FIG. 2 (or a user profile improvement apparatus having similar modules, such as client machines 110 and 112 or application server 112 illustrated in FIG. 1). 2201-2204 are substantially similar to 2001-2004 illustrated in FIG. 20. In 2205, the prompt generation module 204 classifies the first user profile page as a beginner career track profile page, and the second user profile page as a successful career track profile page. In 2206, the prompt generation module 204 generates a prompt and superimposes the prompt over the second user profile page, wherein the prompt invites the first user to update the first user profile page by referring to the successful career track profile page. The prompt may include further references to the second user, to the second user profile page generally, or to any part of the second user profile page (e.g., the specific content portion identified in 2203). It is possible that the method 2200 and may be modified by excluding any one of 2202 and 2203.

Figure 23:
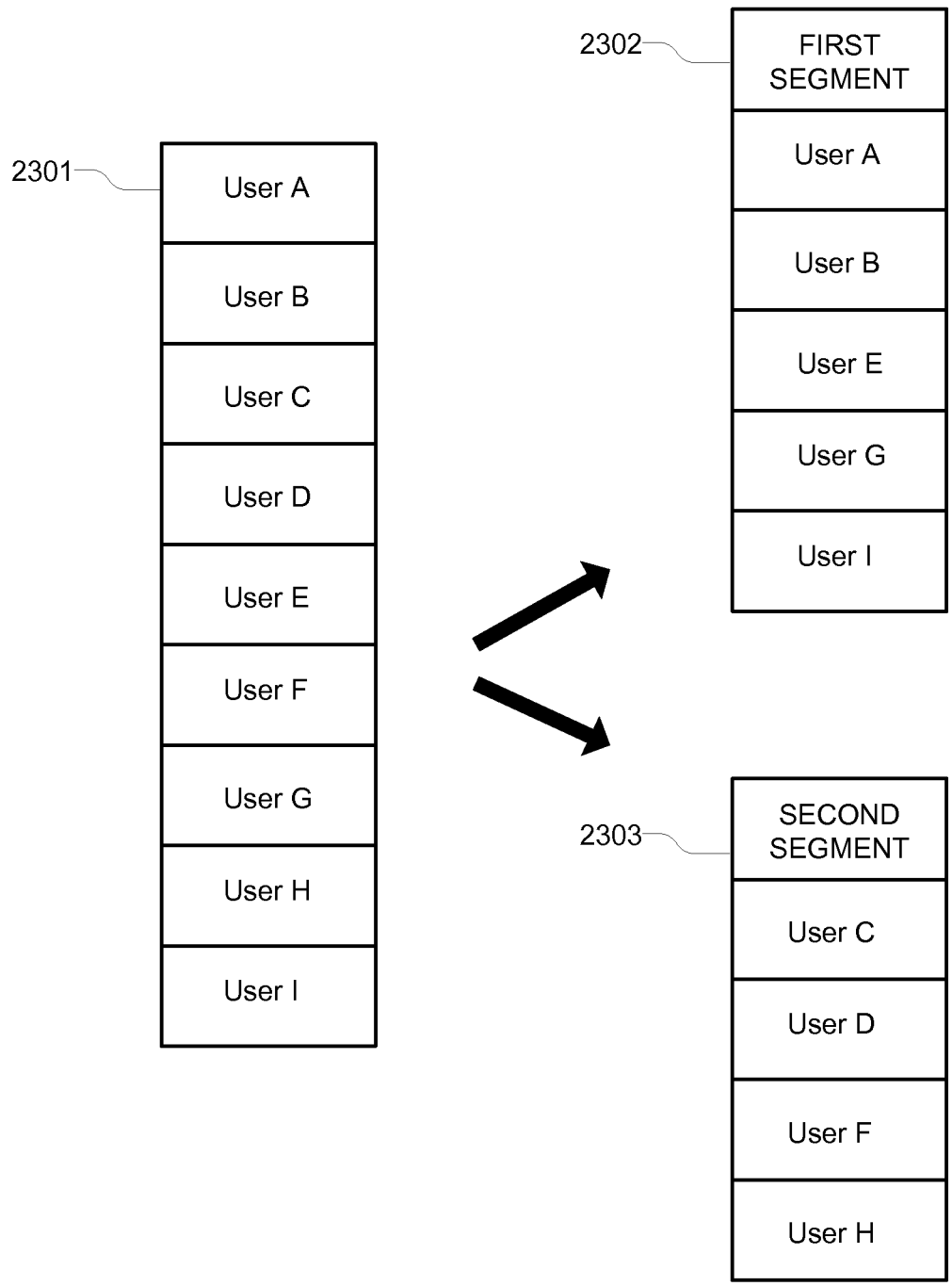
FIG. 23 illustrates a list of a user base, a list of a first segment of the user base, and a list of a second segment of the user base.

According to various exemplary embodiments, the determination module 202 of the user profile improvement system 200 illustrated in FIG. 2 is configured to analyze the user profile pages of a group of users, such as the user base of a particular social or professional networking website. For example, as seen in FIG. 23, the list 2301 may represent a list of all the users (i.e., the user base) of a networking website. Further, the determination module 202 is configured to segment the user base of the networking website into different users segments, based on the content of the user profile pages associated with the users. For example, according to aspects of the various exemplary embodiments described above, the determination module 202 may analyze the user profile pages of all the users in the user base to determine which users have user profile pages that are incomplete and which users have user profile pages that are complete. Thereafter, the determination module 202 may segment the user base into a first group of users having incomplete profiles and a second group of users having complete profiles. For example, as illustrated in FIG. 23, the list 2301 of the user base of a networking website may be segmented into a first segment of users 2302 and a second segment of users 2303, where the first segment of users 2302 may correspond to users having incomplete user profiles, and the second segment of users 2303 may correspond to users having complete user profiles. The various lists of the different user segments that are generated by the determination module 202—as a result of segmenting the user base (based on the content of the user profile pages associated with the users)—may be referred to as user segmentation information. For example, the lists 2302 and 2303 of the first and second segments of users may represent user segmentation information. While FIG. 23 illustrates the user base 2301 being segmented into two user segments 2302 and 2303, it should be understood that the user base may of course be segmented into more than two segments.

As another example, according to various exemplary embodiments described above, the determination module 202 may analyze the user profile pages of all the users in the user base to determine which users have profiles associated with a specific career track (e.g., "Computer Engineering" career track) and that have beginner career track profiles, and determine which users have user profile pages that are associated with the same specific career track (e.g., "Computer Engineering" career track) that have successful career track profiles, and determine which users are not on the specific career track. Thereafter, the determination module 202 may segment the user base into a first segment of users A on a specific career track (e.g., "Computer Engineering" career track) that have beginner career track profiles, a second segment of users B on the same specific career track (e.g., "Computer Engineering" career track) that have successful career track profiles, and a third segment of users C that are not on the specific career track.

After segmenting the user base and generating the user segmentation information, the determination module 202 is configured to determine when a user in a first segment of the user base (e.g., user segment 2301) is viewing the profile of a user in a second segment of the user base (e.g., user segment 2302). Thereafter, the prompt generation module 204 is configured to superimpose a prompt over the profile of the user in the second segment that is currently being viewed by the user in the first segment. The prompt invites the first segment viewer to update their profile, based on the second segment user or the user profile page of the second segment user. Examples of such prompt are illustrated in FIGS. 5-8, 12-15, 19, 21 and described above in various exemplary embodiments.

Figure 24:
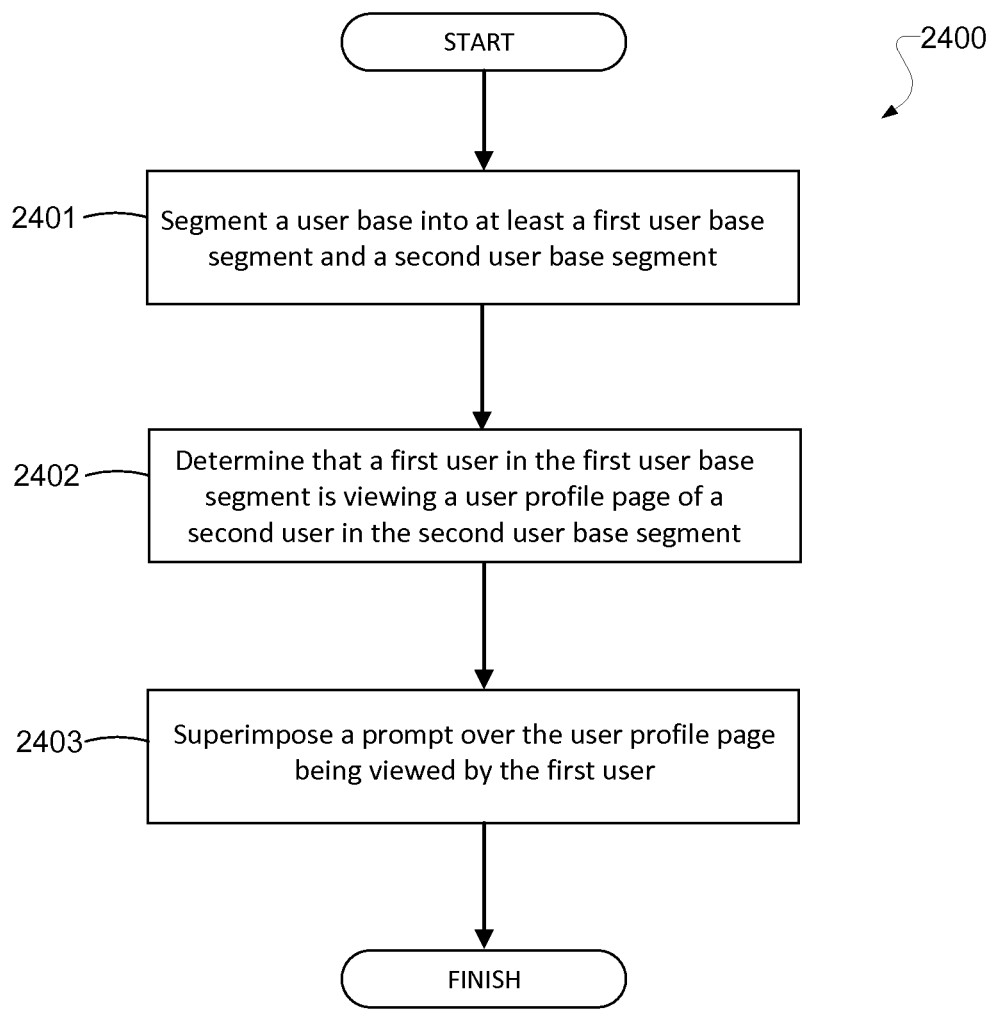
FIG. 24 is a flowchart illustrating an example method, according to various embodiments.

FIG. 24 is a flowchart illustrating an example method 2400, according to various embodiments. The method 2400 may be performed at least in part by, for example, the user profile improvement system 200 illustrated in FIG. 2 (or a user profile improvement apparatus having similar modules, such as client machines 110 and 112 or application server 112 illustrated in FIG. 1). In 2401, the system 200 segments a total user base (e.g., users of a social or professional networking website) into at least a first user base segment and a second user base segment, based on the content of user profile pages associated with the users in the total user base. In 2402, the system 200 determines that a first user in the first user base segment is viewing a user profile page of a second user in the second user base segment. In 2403, the system 200 superimposes a prompt over the user profile page of the second user that is being viewed by the first user, where the prompt invites the first user to update their profile page (by referring to the second user or the user profile page of the second user that is being viewed by the first user).

Referring back to FIG. 9, the method 900 may also be performed based on the aforementioned user segmentation information. For example, in 901, the system 200 determines that a client device corresponding to a first user associated with a first user profile page (e.g., user profile page 300 illustrated in FIG. 3) is currently displaying a second user profile page (e.g., user profile page 400 illustrated in FIG. 4) associated with a second user. In 902, the system 200 classifies the first user profile page as incomplete and the second user profile page as complete, based on user segmentation information (e.g., the lists 2302 and 2303 in FIG. 23) that identifies a first segment of users (e.g., 2302) associated with user profile pages determined to be incomplete profile pages and a second segment of users (e.g., 2303) associated with user profile pages determined to be complete profile pages. For example, the user segmentation information, which may have already been generated at a previous time, may indicate that the first user (e.g. user "Jane Doe" associated with user profile page 300 illustrated in FIG. 3) is in a segment of users that have an incomplete user profile pages, whereas the second user (e.g., user "John Smith" associated with the user profile page 400 illustrated in FIG. 4) is in a segment of users that have a complete user profile pages. In 903, the system 200 superimposes a prompt over the second user profile page being displayed by the client device, where the prompt invites the first user to update the first user profile page (e.g., user profile page 300) based on the content of the second user profile page (e.g., user profile page 400).

While the exemplary embodiments described above refer to the classification of user profile pages as either complete or incomplete, the aspects of this disclosure are equally applicable to a system that classifies user profile pages into any number of categories or levels of completeness, such as levels 1-5, or a 3-level completeness scale including "poor", "moderate", and "strong", and so on.

The prompts described throughout this disclosure are not limited to the example prompts illustrated in the figures. Instead, it should be understood that the prompts may include any information designed to encourage a first user to update their own profile page based on at least a second user profile page currently being viewed by the user, including any prompt with any references to the second user profile page (or parts thereof) being viewed or any references to the second user associated with the second user profile page. For example, according to various exemplary embodiments, the prompt may identify not only the second user or the second user profile page, but also identify other users (e.g., friends or connections of the first user) that are themselves associated with complete profile pages, in order to help encourage the user to update their incomplete user profile.

According to various exemplary embodiments, the prompt generation module 204 only superimposes the prompt over the second user profile page associated with the second user (which is being viewed by the first user associated with the first user profile page), if it is determined that the first user is associated with the second user on the networking website, or the first and the second user have a specific relationship (such as the first and second user being friends, connections, colleagues, followers, etc.) on the networking website. The specific relationship may also take into account an indirect relationship or a degree of connectedness (e.g., must be either a first or second degree connection relationship between the first and second user on the networking website in order to generate and display the prompt).

According to various exemplary embodiments, the prompt generation module 204 only superimposes the prompt over the second user profile page associated with the second user (which is being viewed by the first user associated with the first user profile page), if it is determined that the first and second user have a specific characteristic in common (e.g., same network, same location, same employer, same educational degree, a degree from the same educational institution, past work experience at the same employer, same skills, same activities, similar resume, etc.).

According to various exemplary embodiments, the total number of prompts displayed to a user may be capped at a specific number "X" per time period "Y", such as 5 prompts per month. Alternatively, the number of prompts displayed to a user may be capped to X prompts, at which point the display of prompts may be retired for Y days. For example, after the user sees prompts on 5 profiles, the promotion will be turned off for 30 days. After 30 days, the number of prompts to be displayed will be reset to 5. Alternatively, the frequency cap may be replaced by an X-day window from the first time that the prompt is seen by that user. For example, after the user has seen the prompts for 3 days, the promotion will be turned off for 30 days, and after 30 days, the promotion will be active again for 3 days starting at the first prompt display. According to various exemplary embodiments, after the user clicks the action button (e.g., "Continue", "Update My Profile", "Join", "Yes!", etc.) in any prompt, the display of prompts may be retired for X time period (e.g., 30 days). According to various exemplary embodiments, after the user clicks the 'X' button to close any prompt, the display of prompts will be retired for X time period (e.g., 30 days).

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 25:
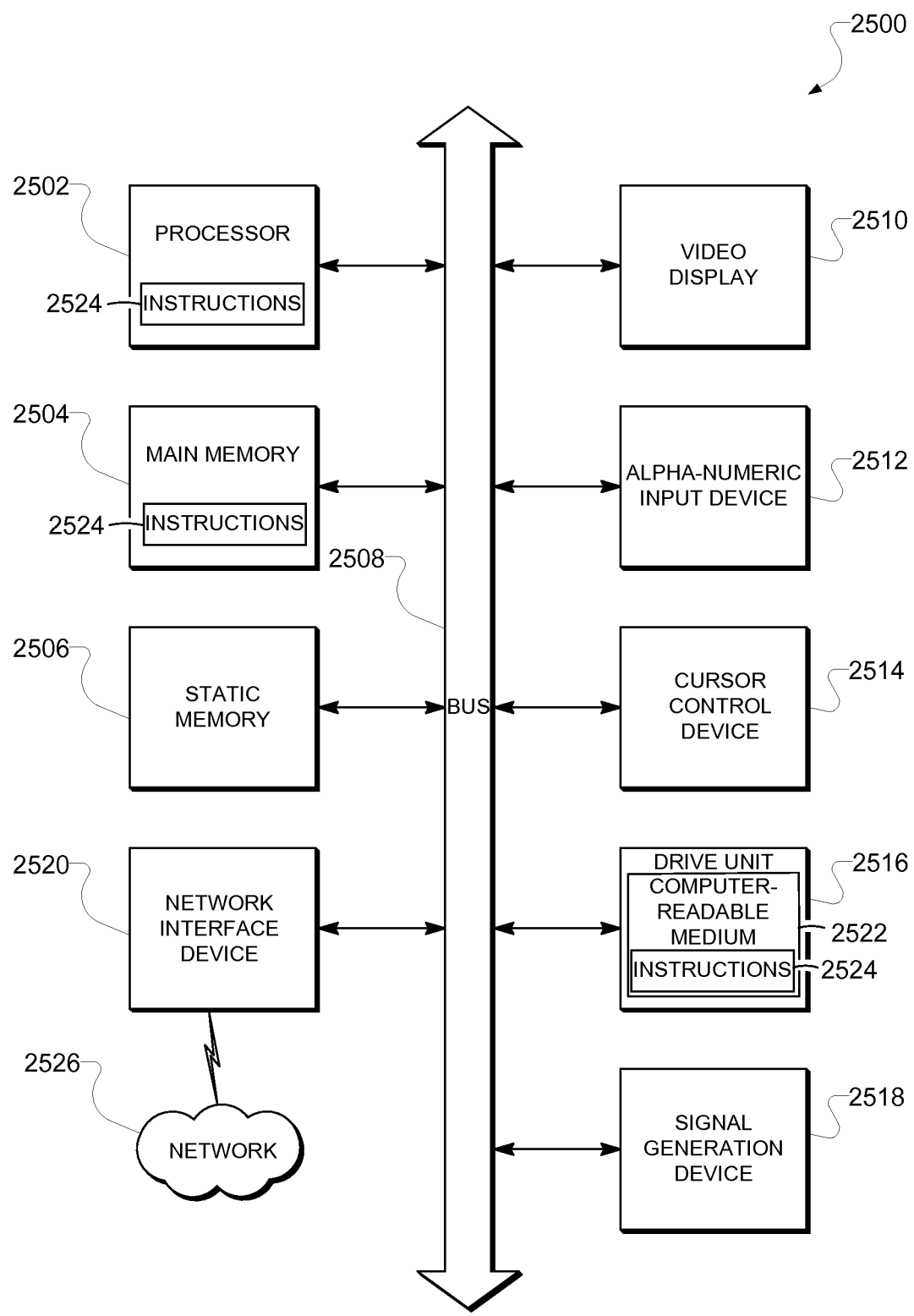
FIG. 25 is a diagrammatic representation of machine in the example form of a computer system within which a set of instructions, for causing the machine to perform any one or more of the methodologies discussed herein, may be executed.

FIG. 25 is a block diagram of machine in the example form of a computer system 2500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processor 2502 (e.g., a central processing unit (CPU), a graphics processing unit (GPU) or both), a main memory 2504 and a static memory 2506, which communicate with each other via a bus 2508. The computer system 2500 may further include a video display unit 2510 (e.g., a liquid crystal display (LCD) or a cathode ray tube (CRT)). The computer system 2500 also includes an alphanumeric input device 2512 (e.g., a keyboard or a touch-sensitive display screen), a user interface (UI) navigation device 2514 (e.g., a mouse), a disk drive unit 2516, a signal generation device 2518 (e.g., a speaker) and a network interface device 2520.

Machine-Readable Medium

The disk drive unit 2516 includes a machine-readable medium 2522 on which is stored one or more sets of instructions and data structures (e.g., software) 2524 embodying or utilized by any one or more of the methodologies or functions described herein. The instructions 2524 may also reside, completely or at least partially, within the main memory 2504 and/or within the processor 2502 during execution thereof by the computer system 2500, the main memory 2504 and the processor 2502 also constituting machine-readable media.

While the machine-readable medium 2522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2524 may further be transmitted or received over a communications network 2526 using a transmission medium. The instructions 2524 may be transmitted using the network interface device 2520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method performed by one or more hardware processors, the method comprising:

determining that a client device is currently displaying, to a first user associated with a first user profile page of an online social networking service (SNS), a second user profile page of the online SNS, the second user profile page being associated with a second user, the second user profile page being accessed by the first user during a session of the online SNS, the first user being a first employment-seeking user of the SNS; the second user being a second employment-seeking user of the SNS;

determining, based on content of the first user profile page and the second user profile page, that the first user profile page and the second user profile page are associated with a common career track, the common career track being identified based on an occupation of the first employment-seeking user and the second employment-seeking user, and a location pertaining to an obtained qualification of the first employment-seeking user and the second employment-seeking user;

determining that the second user profile page associated with the second employment-seeking user is a complete profile page based on a number of completed fields of the second user profile page meeting or exceeding a threshold value;

based on the determining that the client device is currently displaying, to the first employment-seeking user the second user profile page associated with the second employment-seeking user during the session of the online SNS, and based on the determining that the second user profile page associated with the second employment-seeking user is the complete profile page, identifying a content portion of the second user profile page associated with the second employment-seeking user that is (a) currently displayed to the first employment-seeking user and that is (b) missing from the first user profile page associated with the first employment-seeking user, the content portion displayed with a pre-defined profile page section identifier;

generating a prompt that includes the pre-defined profile page section identifier of the specific content portion of the second user profile page that is currently displayed to the first user and that is missing from the first user profile page, the prompt further comprising an identification of the second user, a reference to the common career track determined to be associated with the first user profile page and the second user profile page, an indication of an advantage of updating the first user profile page with the specific content portion to make it more similar to the second user profile page, and a selectable functionality to initiate updating, during the session of the online SNS, the first user profile page with the specific content portion; and superimposing the prompt over the second user profile page currently being displayed by the client device to the first user.

2. The method of claim 1, further comprising:
displaying the prompt proximate to the specific content portion of the second user profile page, wherein the prompt identifies an advantage associated with the specific content portion of the second user profile page.

3. The method of claim 1, wherein the specific content portion of the second user profile page corresponds to at least one of a user photo, an education listing, an experience listing, or a portfolio listing.

4. The method of claim 1, wherein the prompt identifies a ranking associated with the second user profile page.

5. The method of claim 1, wherein the selectable functionality comprises a reference link to a user profile completion webpage that includes instructions for updating the first user profile page.

6. The method of claim 1, further comprising:
classifying the first user profile page as incomplete and the second user profile page as complete based on the content of the first user profile page and the content of the second user profile page,
wherein the first and second user profile pages are classified respectively as incomplete or complete based on at least one of:
a number of education listings included in at least one of the first and second user profile pages,
a number of experience listings included in the at least one of the first and second user profile pages, or
a number of photographs included in the at least one of the first and second user profile pages.

7. The method of claim 6, wherein each of the first and second user profile pages are classified as incomplete or complete based on user segmentation information identifying a first segment of users associated with user profile pages determined to be incomplete profile pages, and a second segment of users associated with user profile pages determined to be complete profile pages.

8. The method of claim 1, further comprising:
classifying the second user profile page as a successful career track profile page,
wherein the generating of the prompt comprises generating an invitation prompt that invites the first user to update the first user profile page based on the successful career track profile page.

9. The method of claim 8, wherein the second user profile page is classified as the successful career track profile page based at least on one of:
an education listing included in the second user profile page,
an experience listing included in the second user profile page,
a view count associated with the second user profile page, or
a search result visibility ranking associated with the second user profile page.

10. The method of claim 1, wherein the second user profile page identifies the second user and the first user profile page identifies the first user, the first user being different from the second user.

11. The method of claim 1, wherein the pre-defined profile page section identifier comprises at least one of:
a work experience section identifier,
a media portfolio section identifier, or
an education section identifier.

12. A computer system comprising:
one or more hardware processors; and
a machine-readable medium for storing instructions that, when executed by the one or more hardware processors, cause the one or more hardware processors to perform operations comprising:
determining that a client device is currently displaying, to a first user associated with a first user profile page of an online social networking service (SNS), a second user profile page of the online SNS, the second user profile page being associated with a second user, the second user profile page being accessed by the first user during a session of the online SNS, the first user being a first employment-seeking user of the SNS, the second user being a second employment-seeking user of the SNS;
determining, based on content of the first user profile page and the second user profile page, that the first user profile page and the second user profile page are associated with a common career track, the common career track being identified based on an occupation of the first employment-seeking user and the second employment-seeking user, and a location pertaining to an obtained qualification of the first employment-seeking user and the second employment-seeking user;
determining that the second user profile page associated with the second employment-seeking user is a complete profile page based on a number of completed fields of the second user profile page meeting or exceeding a threshold value;
based on the determining that the client device is currently displaying, to the first employment-seeking user the second user profile page associated with the second employment-seeking user during the session of the online SNS, and based on the determining that the second user profile page associated with the second employment-seeking user is the complete profile page, identifying a content portion of the second user profile page associated with the second employment-seeking user that is (a) currently displayed to the first employment-seeking user and that is (b) missing from the first user profile page associated with the first employment-seeking user, the content portion displayed with a pre-defined profile page section identifier;
generating a prompt that includes the pre-defined profile page section identifier of the specific content portion of the second user profile page that is currently displayed to the first user and that is missing from the first user profile page, the prompt further comprising an identification of the second user, a reference to the common career track determined to be associated with the first user profile page and the second user profile page, an indication of an advantage of updating the first user profile page with the specific content portion to make it more similar to the second user profile page, and a selectable functionality to initiate updating, during the session of the online SNS, the first user profile page with the specific content portion; and
superimposing the prompt over the second user profile page currently being displayed by the client device to the first user.

13. The computer system of claim 12, wherein the generating of the prompt comprises:

generating the prompt to include an identification of the specific content portion of the second user profile page.

14. The computer system of claim 12, wherein the superimposing of the prompt over the second user profile page that is currently displayed by the client device to the first user comprises:
displaying the prompt proximate to the specific content portion of the second user profile page.

15. The computer system of claim 12, wherein the generating of the prompt comprises:
generating the prompt to include an identification of an advantage associated with the specific content portion of the second user profile page.

16. The computer system of claim 12, wherein the generating of the prompt comprises:
generating the prompt to include an identification of a ranking associated with the second user profile page.

17. The computer system of claim 12, wherein the operations further comprise:
classifying the first user profile page as incomplete and the second user profile page as complete based on the content of the first user profile page and the content of the second user profile page.

18. The computer system of claim 13, wherein the operations further comprise:
classifying the second user profile page as a successful career track profile page, and
wherein the generating of the prompt comprises generating the prompt to include an invitation that invites the first user to update the first user profile page based on the successful career track profile page.

19. A non-transitory machine-readable storage medium storing instructions that, when executed by one or more hardware processors, cause the one or more hardware processors to perform operations comprising:
determining that a client device is currently displaying, to a first user associated with a first user profile page of an online social networking service (SNS), a second user profile page of the online SNS, the second user profile page being associated with a second user, the second user profile page being accessed by the first user during a session of the online SNS, the first user being a first employment-seeking user of the SNS, the second user being a second employment-seeking user of the SNS;
determining, based on content of the first user profile page and the second user profile page, that the first user profile page and the second user profile page are associated with a common career track, the common career track being identified based on an occupation of the first employment-seeking user and the second employment-seeking user, and a location pertaining to an obtained qualification of the first employment-seeking user and the second employment-seeking user;
determining that the second user profile page associated with the second employment-seeking user is a complete profile page based on a number of completed fields of the second user profile page meeting or exceeding a threshold value;
based on the determining that the client device is currently displaying, to the first employment-seeking user the second user profile page associated with the second employment-seeking user during the session of the online SNS, and based on the determining that the second user profile page associated with the second employment-seeking user is the complete profile page, identifying a content portion of the second user profile page associated with the second employment-seeking user that is (a) currently displayed to the first employment-seeking user and that is (b) missing from the first user profile page associated with the first employment-seeking user, the content portion displayed with a pre-defined profile page section identifier;
generating a prompt that includes the pre-defined profile page section identifier of the specific content portion of the second user profile page that is currently displayed to the first user and that is missing from the first user profile page, the prompt further comprising an identification of the second user, a reference to the common career track determined to be associated with the first user profile page and the second user profile page, an indication of an advantage of updating the first user profile page with the specific content portion to make it more similar to the second user profile page, and a selectable functionality to initiate updating, during the session of the online SNS, the first user profile page with the specific content portion; and
superimposing the prompt over the second user profile page currently being displayed by the client device to the first user.

* * * * *

UNITED STATES PATENT AND TRADEMARK OFFICE
CERTIFICATE OF CORRECTION

PATENT NO. : 10,528,912 B2  
APPLICATION NO. : 13/673196  
DATED : January 7, 2020  
INVENTOR(S) : Berger et al.

Page 1 of 1

It is certified that error appears in the above-identified patent and that said Letters Patent is hereby corrected as shown below:

In the Claims

In Column 24, Line 30, in Claim 1, delete "SNS;" and insert --SNS,-- therefor

In Column 27, Line 24, in Claim 18, delete "claim 13," and insert --claim 12,-- therefor Signed and Sealed this  
Fifth Day of May, 2020

Andrei Iancu  
*Director of the United States Patent and Trademark Office*